(12) United States Patent
Guo et al.

(10) Patent No.: US 12,373,267 B2
(45) Date of Patent: Jul. 29, 2025

(54) ACCESSING SERVICE APPLICATION COMPONENTS ACROSS MULTIPLE DEVICES

(71) Applicant: Huawei Technologies Co., Ltd., Guangdong (CN)

(72) Inventors: Jiehua Guo, San Diego, CA (US); Yiwei Zhao, San Jose, CA (US); Juan Chen, Campbell, CA (US); Xiaofeng Li, Palo Alto, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 599 days.

(21) Appl. No.: 17/806,416

(22) Filed: Jun. 10, 2022

(65) Prior Publication Data
US 2022/0300358 A1 Sep. 22, 2022

Related U.S. Application Data

(63) Continuation of application No. PCT/US2020/070218, filed on Jun. 30, 2020.

(51) Int. Cl.
*G06F 9/54* (2006.01)

(52) U.S. Cl.
CPC ............. *G06F 9/546* (2013.01); *G06F 9/541* (2013.01)

(58) Field of Classification Search
CPC .......... G06F 9/546; G06F 9/541; G06F 9/547; H04L 67/133
See application file for complete search history.

(56) References Cited

U.S. PATENT DOCUMENTS

| 8,984,617 B1 * | 3/2015 | Fausak | H04L 69/321 |
| | | | 719/330 |
| 2005/0210142 A1 * | 9/2005 | de Jong | G06F 9/548 |
| | | | 709/228 |

(Continued)

FOREIGN PATENT DOCUMENTS

| CN | 107683601 A | 2/2018 |
| CN | 109155782 A | 1/2019 |

(Continued)

OTHER PUBLICATIONS

Kakao et al., "Toward Remote Service Invocation in Android" (Sep. 2012), 9th International Conference on Ubiquitous Intelligence and Computing and 9th International Conference on Autonomic and Trusted Computing, pp. 612-617 [retrieved from https://ieeexplore.ieee.org/abstract/document/6332055]. (Year: 2012).*

(Continued)

*Primary Examiner* — Brian W Wathen
(74) *Attorney, Agent, or Firm* — Schwegman Lundberg & Woessner, P.A.

(57) ABSTRACT

A mobile device implements an inter-device inter-process communication (IPC) mechanism by which services on each device in a cluster group may be accessed by other devices in the cluster group using intra-device IPC calls. The inter-device IPC mechanism extends the existing intra-device IPC mechanism so that it may be used by existing applications across devices in the cluster group with little or no modification to the applications. A mobile device establishes pseudo-tokens for objects on the mobile device and pseudo-handlers for objects on the other devices. A mobile device may access multiple objects on other devices and may provide multiple other devices with access to a local object. Each object accessed via an inter-device IPC call is associated with a respective service adapter in a respective communication service gateway of each of the participating devices.

20 Claims, 11 Drawing Sheets

(56) References Cited

U.S. PATENT DOCUMENTS

2015/0278528 A1* 10/2015 Xing .................. G06F 21/53
                                                    726/26
2019/0121682 A1*  4/2019 Adiletta ................ G06F 9/48

FOREIGN PATENT DOCUMENTS

| KR | 20160080487 A | 7/2016 |
| KR | 101927721 B1 | 2/2019 |
| WO | WO-2022005522 A1 | 1/2022 |

OTHER PUBLICATIONS

"International Application Serial No. PCT/US2020/070218, International Preliminary Report on Patentability mailed Jan. 12, 2023", 8 pgs.

"Chinese Application No. 202080102630.3, First Office Action dated Sep. 3, 2024", (Sep. 3, 2024), 18 pgs.

"International Application Serial No. PCT/US2020/070218, International Search Report mailed Mar. 10, 2021", 5 pgs.

"International Application Serial No. PCT/US2020/070218, Written Opinion mailed Mar. 10, 2021", 6 pgs.

Kang, Heeeun, et al., "Android RMI: a user-level remote method invocation mechanism between Android devices", Journal of Supercomputing, Kluwer Academic Publishers, Dordrecht, NL, vol. 72, No. 7, (Jul. 2, 2015), 2471-2487.

* cited by examiner

ACCESSING SERVICE APPLICATION COMPONENTS ACROSS MULTIPLE DEVICES

CROSS-REFERENCE TO RELATED APPLICATIONS

This application is a continuation of International Application No. PCT/US2020/070218, filed on Jun. 30, 2020, entitled "ACCESSING SERVICE APPLICATION COMPONENTS ACROSS MULTIPLE DEVICES," the benefit of priority of which is claimed herein, and which application is hereby incorporated herein by reference in its entirety.

TECHNICAL FIELD

The disclosure generally relates to enabling application service components to be accessed across devices. In particular, the disclosure relates to the implementation of an inter-process communication (IPC) mechanism that can be used by existing applications to enable access to service components and resources across multiple devices.

BACKGROUND

Mobile devices such as smartphones and tablet computers typically act as standalone devices to offer services to a user. Data security and reliability are issues for these devices due to the many different types of applications that may run on the devices. To reduce the possibility of undesirable interaction between or among applications, the operating systems used by these devices typically isolate each executing application in a separate container or sandbox.

As used herein, a container is a software package that includes the executable program as well as system tools, libraries, settings, and other data or code used by the software. A sandbox is a separate address space that is used by an application. Both containers and sandboxes isolate the programs they contain from the other software and the operating system (OS). Although these concepts are different, they both provide a mechanism for separating programs running in a common environment. Accordingly, for the sake of simplicity, any use of the term container also includes sandbox functionality. Because they separate the programs running on the mobile devices, containers provide security benefits, since the software running in the container will not affect the host operating system or other programs running on the mobile device. While a program running in a container may alter system settings and modify resources, the program only modifies settings within the container.

Multiple containers, each corresponding to a different application or service, run on a shared OS kernel. Containers are implemented in a layer above the physical processing system and its host OS, such as Apple® IOS or Google® Android. Each container shares the host OS kernel and may share other software components, such as libraries. Shared components, however, are typically read-only to prevent interaction between or among applications running in separate Containers.

Inter-process communication (IPC) is a fundamental mechanism used by an operating system to allow an application running in one container to communicate with another application running in another container on the same device. Through IPC, a service can interact with multiple clients on the same device. For example, on Android, the Binder service provides the IPC mechanism for client components to interact with a service component. In Apple IOS, IPC may be implemented using the Apple MACH Message/App Extensions which allow members of an application group to share a common container that may be used by the applications to share data. Thus, IPC provides a mechanism for applications running in separate containers to communicate with each other. IPC allows a client application to bind a service; and then invoke data and/or methods exported by the service, even when the client and service are running in different containers. A bound service is an implementation of a service class that allows other applications to interact with the service; while "bind" indicates an action to establish a connection with a bound service. An IPC driver implemented in the kernel may provide links to the different services that may be accessed using IPC.

FIG. 1 is a block diagram of a mobile device 100 that includes processing hardware 122, an operating system kernel 118, and two applications: process A, running in container 102 and having user data 104, and process B running in container 112 and having user data 114. In this example, process A (the client) wants to access the user data 114 of process B (the server). Process A includes an IPC token 106 for the user data 114 and process B includes an IPC handler 116 for the user data 114.

A typical IPC system operates as follows. First, the client application establishes a channel to the server application. To do this, the client, process A, initiates an establishment request by sending an intent, which includes information about the server, process B, (such as the package name, service class name, and other data regarding the requested service) to IPC driver 120. The IPC driver 120 polls the system server (not shown) to determine whether the server provides the user data 114 as the requested service and has created an IPC handler 116 for the service. Although FIG. 1 shows the user data 114 as the service, it is contemplated that a service may be a process or application running on the server and/or a database accessible on the server. Information about the service is registered in the system server of the mobile device 100 so that the service may be accessed by other applications running on the mobile device 100. The IPC driver then creates an IPC token 106 and returns the IPC token 106 to the client, process A. To access service 114, process A encapsulates a Call ID (an identifier describing the origin of the request and any parameters used by service 114) into a parcel. Process A then passes the parcel and the IPC token 106 to IPC driver 120. The IPC Driver uses the IPC Token to identify the corresponding IPC Handler, based on the previously established channel and passes the parcel to the IPC handler 116 of process B. The IPC handler 116 then decapsulates the parcel, processes the service request, and returns the result to the IPC driver 120 with the Call ID. The IPC Driver passes the result to Process A based on the Call ID. Because one server application can serve many clients, an IPC handler in a server application can be associated with many IPC tokens in different client applications.

BRIEF SUMMARY

The examples below describe one or more apparatus and methods for implementing an inter-device IPC mechanism that is compatible with existing intra-device IPC mechanisms. A mobile device registers objects on other devices and establishes pseudo-handlers for those objects. The mobile device also establishes pseudo-tokens for objects on the mobile device that may be accessed by other devices. A pseudo token is a placeholder for an IPC token used to access a service. The pseudo-token exists on the server device and stands in for the IPC token in an intra-device IPC call for an object on the server device. A client device employs an IPC token and a pseudo-handler to implement an intra-device IPC call on the client device. A communication link between the pseudo-handler on the client device and the pseudo-token on the server device links the client and server devices, enabling the inter-device IPC call. A mobile device may access multiple objects on other devices and may provide multiple other devices with access to a local object on the mobile device. Each object accessed via an inter-device IPC call is associated with a respective service adapter in a respective communication service gateway of each of the participating devices.

These examples are encompassed by the features of the independent claims. Further embodiments are apparent from the dependent claims, the description, and the figures.

According to a first aspect of the present disclosure, a first device obtains a first request to bind a first object on the first device, from a second device via a communication service gateway of the first device. The first device assigns a first pseudo-token for the first object to the communication service gateway. The first device creates a first service context for the first object and associates the first service context with the first pseudo-token. The first device provides the first service context to the second device via the communication service gateway as a response to the first request to bind the first object.

In a first implementation of the first device according to the first aspect, the first device obtains an inter-device IPC call and a first service context associated with the first object from the second device via the communication service gateway of the first device. The first device identifies the first pseudo-token as being associated with the first service context and obtains an inbound parcel including input parameters for the inter-device IPC call. The first device processes the inbound parcel and initiates an intra-device IPC call with the processed inbound parcel for the first object using the first pseudo-token. The first device obtains a reply to the intra-device IPC call, with the reply including an outbound parcel. The first device processes the outbound parcel and provides the processed outbound parcel to the second device via the communication service gateway, the processed outbound parcel being provided with the response to the inter-device IPC call.

In a second implementation of the first device according to the first aspect, the first device obtains a second request to bind a second object from an application running on the first device and determines that the second object is a remote object on a second device. The first device generates a message including the second request and provides the message to the second device via the communication service gateway. The first device obtains a second service context for the second object from the second device as a response to the second request to bind the second object. The first device creates a first pseudo-handler for the second object and associates the second service context with the first pseudo-handler in the communication service gateway on the first device. The first device provides an IPC token corresponding to the first pseudo-handler to the application running on the first device.

In a third implementation of the first device according to the first aspect, the first device obtains an intra-device IPC call for the second object on the second device from the application running on the first device. The first device invokes the first pseudo-handler in the communication service gateway and identifies the second service context as being associated with the first pseudo-handler. The first device obtains an outbound parcel including input parameters for an inter-device IPC call. The first device processes the outbound parcel and provides the inter-device IPC call with the processed outbound parcel and the second service context to the second device via the communication service gateway. The first device obtains, via the communication service gateway, a reply to the inter-device IPC call which includes an inbound parcel from the second device. The first device processes the inbound parcel and provides the processed inbound parcel to the application as a response to the intra-device IPC call.

In a fourth implementation of the first device according to the first aspect, the first device obtains a third request to bind a third object on the first device from a third device via the communication service gateway. The first device assigns a second pseudo-token for the third object to the communication service gateway. The first device obtains a third service context for the third object and associates the third service context with the second pseudo-token for the third object. The first device provides the third service context to the third device via the communication service gateway as a response to the third request to bind the third object.

In a fifth implementation of the first device according to the first aspect, the first device obtains a second request to bind the first object on the first device from a third device, via the communication service gateway and provides the first service context to the third device via the communication service gateway as a response to the second request to bind the first object.

In a sixth implementation of the first device according to the first aspect, the third device includes the second device.

According to a second aspect of the present disclosure, a first device obtains a first request to bind a first object from an application running on the first device. The first device determines that the first object is a remote object on a second device and generates a message that includes the first request. The first device provides the message to the second device via a communication service gateway on the first device. In response to the message, the first device obtains a first service context for the first object from the second device. The first device creates a first pseudo-handler and associates the first pseudo-handler with the first service context in the communication service gateway. The first device provides a first IPC token corresponding to the first pseudo-handler to the application on the first device.

According to a first implementation of the first device according to the second aspect, the first device obtains an intra-device IPC call for the first object on the second device from the application running on the first device. The first device invokes the first pseudo-handler in the communication service gateway and identifies the first service context associated with the first pseudo-handler on the first device. The first device obtains an outbound parcel including input parameters for an inter-device IPC call, processes the outbound parcel, and provides the inter-device IPC call with the processed outbound parcel and the first service context to the second device via the communication service gateway. The first device obtains an inbound parcel from the second device as a reply to the inter-device IPC call. The first device processes the inbound parcel and provides the processed inbound parcel to the application with a response to the intra-device IPC call.

According to a second implementation of the first device according to the second aspect, the first device obtains a second request to bind a second object from the application and determines that the second object is a remote object on a third device. The first device generates a message including the second request and provides the message to the third device via the communication service gateway. The first device obtains a second service context for the second object from the third device as a response to the second request to bind the second object. The first device creates a second pseudo-handler and associates the second pseudo-handler with the second service context in the communication service gateway. The first device provides a second IPC token corresponding to the second pseudo-handler to the application.

According to a third implementation of the first device according to the second aspect, the third device includes the second device.

According to a fourth implementation of the first device according to the second aspect, the first device obtains a third request to bind the first object from a second application running on the first device and determines that the first object is a remote object on the second device. The first device identifies the first pseudo-handler for the first object and provides a third IPC token corresponding to the first pseudo-handler to the second application.

According to a fifth implementation of the first device according to the second aspect, the first device obtains a fourth request to bind a third object on the first device from the second device via the communication service gateway of the first device. The first device assigns a second pseudo-token for the third object to the communication service gateway. The first device creates a third service context for the third object and associates the third service context with the second pseudo-token for the third object. The first device provides the third service context to the second device via the communication service gateway as a response to the fourth request to bind the third object.

According to a first implementation of the first device according to the first or second aspects, the first device processes the outbound parcel by identifying a marshaled object in the outbound parcel and determining that the marshaled object references a local data object outside of the parcel. The first device further processes the outbound parcel by creating a local data object stub for the marshaled object and a reference to the local data object stub and marshaling the reference to the local data object stub into the processed outbound parcel as a replacement for the marshaled object.

According to a second implementation of the first device according to the first or second aspects, the first device processes the outbound parcel by identifying a marshaled object in the outbound parcel and determining that the marshaled object is a data descriptor for data values outside of the outbound parcel. The first device further processes the outbound parcel by creating a reference to the data descriptor and marshaling the reference to the data descriptor into the processed outbound parcel as a replacement for the data descriptor.

According to a third implementation of the first device according to the first or second aspects, the first device processes the inbound parcel by identifying a marshaled object in the inbound parcel and determining that the marshaled object is a reference to a remote data object stub. The first device further processes the inbound parcel by creating a remote data object proxy linked to the remote data object stub to allow remote access to a remote data object referenced by the remote data object stub and marshals the remote data object proxy into the processed inbound parcel as a replacement for the marshaled object.

According to a fourth implementation of the first device according to the first or second aspects, the first device processes the inbound parcel by determining that an identified marshaled object in the inbound parcel is a reference to a data descriptor for referenced data values outside of the inbound parcel. The first device further processes the inbound parcel by obtaining and storing the referenced data values and creating a new data descriptor for the locally stored referenced data values. The first device marshals the new data descriptor into the processed inbound parcel as a replacement for the marshaled object.

According to a fifth implementation of the first device according to the first or second aspects, the first device processes the outbound parcel by determining that an identified marshaled object in the outbound parcel includes an IPC token object for a further object local to the first device. The first device further processes the outbound parcel by creating a further service context for the IPC token object, marshaling the further service context into the processed outbound parcel as a replacement for the IPC token object, and associating the further service context with the IPC token object.

According to a sixth implementation of the first device according to the first or second aspects, the first device obtains from the second device and via the communication service gateway of the first device, a further inter-device IPC call and the further service context for the further object. The first device identifies the IPC token object as being associated with the further service context and obtains a further inbound parcel including input parameters for the further inter-device IPC call. The first device processes the further inbound parcel and initiates a further intra-device IPC call with the processed further inbound parcel for the second object, using a pseudo-token for the second object. The first device obtains a further reply to the further intra-device IPC call, the further reply including a further outbound parcel, processes the further outbound parcel, and provides the processed further outbound parcel to the second device via the communication service gateway with a reply to the inter-device IPC call.

According to a seventh implementation of the first device according to the first or second aspects, in processing the inbound parcel, the first device determines that an identified marshaled object in the inbound parcel includes a further service context for a further object on the second device. The first device creates a service pseudo-handler for the further service context and marshals the service pseudo-handler into the processed inbound parcel as a replacement for the marshaled further service context. The first device associates the service pseudo-handler with the further service context.

According to an eighth implementation of the first device according to the first or second aspects, the first device obtains an intra-device IPC call for the further object on the second device. The first device invokes the service pseudo-handler, identifies the further service context associated with the service pseudo-handler on the first device, and obtains a further outbound parcel including input parameters for a further inter-device IPC call. The first device processes the further outbound parcel and provides the further inter-device IPC call with a processed further outbound parcel and the further service context to the second device via the communication service gateway. The first device obtains a further inbound parcel from the second device via the communication service gateway as a reply to the further inter-device IPC call. The first device processes the further inbound parcel and provides the processed further inbound parcel as a response to the intra-device IPC call.

This Summary is provided to introduce concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying FIGS. for which like references indicate elements.

DETAILED DESCRIPTION

Figure 1:
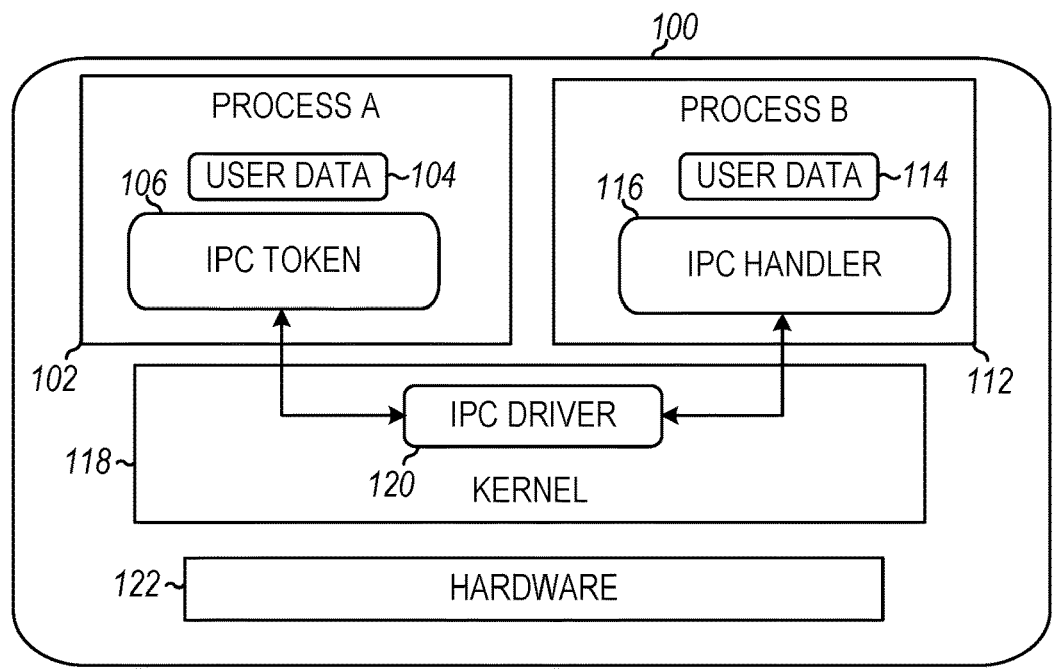
FIG. 1 (prior art) is a block diagram of an example mobile device.

IPC mechanisms used on mobile devices are designed to support interaction among processes running in the same operating system on a single device. The services of a device are typically not visible across a device boundary and cannot be used by client applications running on other devices, via IPC. Currently, some applications work across devices. These applications use either a Remote Procedure Call (RPC) or a RESTful (REpresentational State Transfer) application programming interface (API) and/or a specialized Software Development Kit (SDK) to implement special-purpose solutions. These specialized solutions typically entail significant programming effort and/or modification of existing applications. Embodiments described below implement a protocol that allows devices to form cluster groups, each group containing two or more devices. The protocol enables services on one device to be accessed by other devices within the cluster group. The protocol implemented in these embodiments extends the existing IPC mechanism so that it may be used by existing applications across devices in the cluster group with little or no modification to the applications. The example protocol may be implemented as an addition to the OS kernel in a manner that allows applications running on the devices in the cluster group to access resources using the existing IPC framework that includes IPC tools used to implement IPC on each device. Because different devices may employ different IPC tools, the subject application does not refer to specific tools and instead refers to generalized tools, such as an IPC token, IPC handler, and IPC driver. In addition, the subject application describes additional IPC tools for inter-device IPC including a pseudo-token, a pseudo-handler, two communication service gateways, an RPC adapter, and a communication service such as an RPC service.

It should be understood at the outset that although an illustrative implementation of one or more embodiments is provided below, the disclosed systems, methods, and/or apparatuses described with respect to FIGS. 1-12 may be implemented using any number of techniques, whether currently known or not yet in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In the following description, reference is made to the accompanying drawings that form a part hereof, and in which are shown, by way of illustration, specific embodiments which may be practiced. These embodiments are described in sufficient detail to enable those skilled in the art to practice the inventive subject matter and it is to be understood that other embodiments may be utilized, and that structural, logical, and electrical changes may be made without departing from the scope of the present disclosure. The following description of example embodiments is, therefore, not to be taken in a limiting sense, and the scope of the present disclosure is defined by the appended claims.

Figure 2:
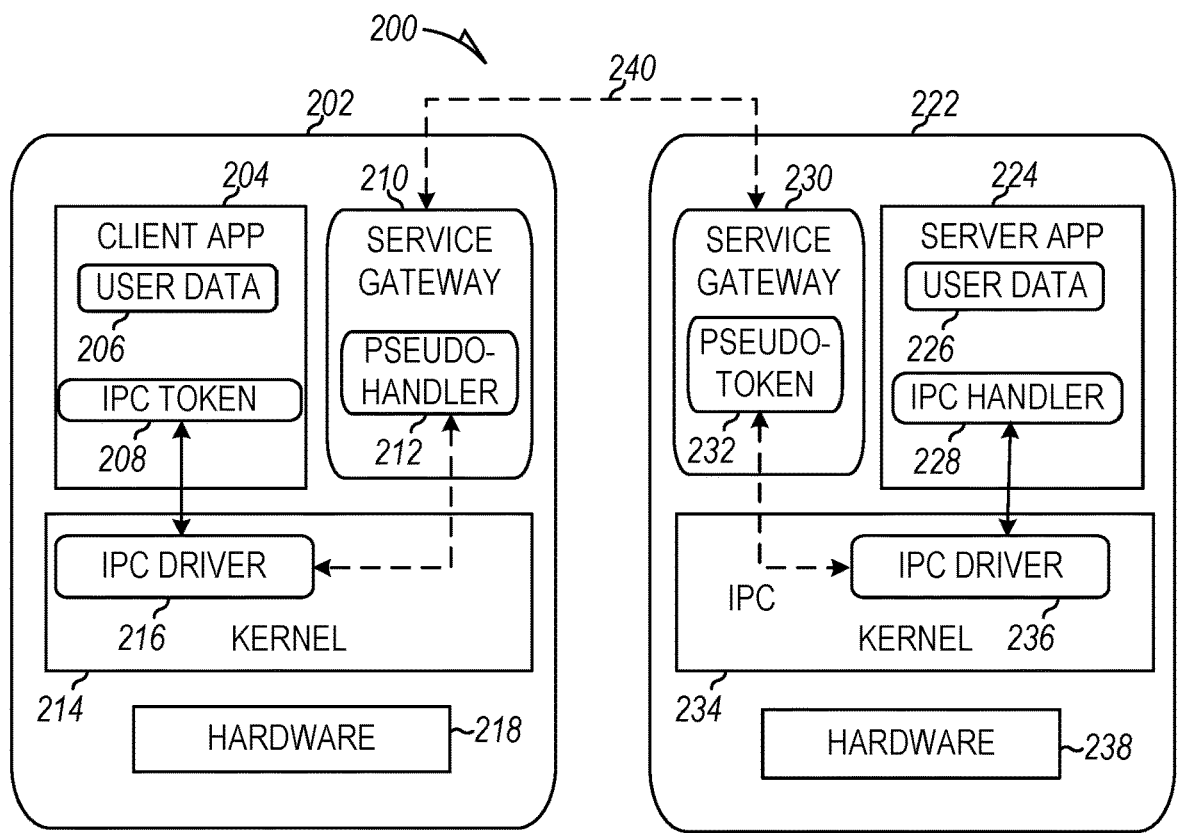
FIGS. 2, 3, and 4 are block diagrams of systems including inter-device IPC mechanisms according to example embodiments.

FIG. 2 is a block diagram of a system 200 including an inter-device IPC mechanism according to an example embodiment. The example inter-device IPC mechanism is transparent and compatible with the existing intra-device IPC mechanism. Accordingly, for many existing client applications, the same code may be used both for intra-device and inter-device IPC communications. The example system shown in FIG. 2 includes two mobile devices, a client device 202 and a server device 222. The description below uses the labels "client" and "server" to describe the users and providers of a service. Any of the devices described below may operate as either a client, a server, or both. The example client device 202 includes hardware 218, and an OS kernel 214 containing an IPC driver 216. The client device 202 includes a client application 204 having user data 206 and an IPC token 208. The example client device 202 also has a communication service gateway 210 including a pseudo-handler 212, which will be described in more detail below. The communication service gateway 210 in client device 202 allows for inter-device IPC with little or no change to the client application 204. The communication service gateway 210 uses the existing local IPC driver 216 to provide access to a service, for example, a user data object 226 of the server application 224. The example server device 222 includes hardware 238, a kernel 234 including an IPC driver 236, a server application 224 that includes user data object 226, and an IPC handler 228. The server device also includes a communication service gateway 230 having a pseudo-token 232, both of which are described below. The client device 202 is coupled to the server device 222 via a communication channel 240. The communication channel used in the example embodiments is an RPC channel using socket connections. For example, channel 240 may include a RESTful API.

In the example system 200, the server device 222 advertises the available services (e.g. the user data object 226) provided by its server application 224 upon joining the cluster group. In some example embodiments, multiple server applications 224 may provide services that are advertised by the server device 222. As described below regarding FIGS. 3 and 5A, the client device 202 registers these services so that they may be accessed using the IPC tools of the client device 202. The client application 204 requests access to the registered user data object 226 and obtains the IPC token 208 corresponding to the registered service. The IPC driver 216, using the normal IPC mechanism, sends the request to the communication service gateway 210, which creates a pseudo-handler 212 on the client device 202 that corresponds to the registered user data object 226. Thus, the client application 204 accesses the user data object 226 using the IPC token 208 and the existing IPC driver 216 as if the user data object 226 were hosted by the client device. The pseudo-handler 212 processes the request for the user data object 226 and transmits the request to the server device 222. In the example embodiment, the transmission occurs using the communication channel 240 (e.g., an RPC channel) between the client device 202 and the server device 222. When the server device receives the request via the communication channel 240, it unpacks the request and sets up a communication service gateway 230, which includes a pseudo-token 232 for the user data object 226. The pseudo-token 232 corresponds to the pseudo-handler 212. The communication service gateway 230 uses the pseudo-token 232 and the IPC driver 236 to access the user data object 226 according to the normal intra-device IPC mechanism of the server device 222 using the IPC handler 228. In the example shown in FIG. 2, the communication service gateway sends the request for the user data object 226, with the pseudo-token 232, to the IPC driver 236. The IPC driver, in turn, sends the request to the IPC handler 228. The IPC handler 228 provides the requested data object 226 to the communication service gateway 230 using the IPC driver 236. The communication service gateway 230 then processes the data for transmission to the client device via the communication channel 240. The communication service gateway 210 on the client device 202 unpacks the data and provides it to the client application 204 via the pseudo-handler 212 and IPC driver 216. The communication service gateway 210, the pseudo-handler 212, the communication channel 240, the communication service gateway 230, and the pseudo-token 232 act as a nominal man-in-the-middle service that is transparent to the processes running on the client device 202 and the server device 222.

Figure 3:
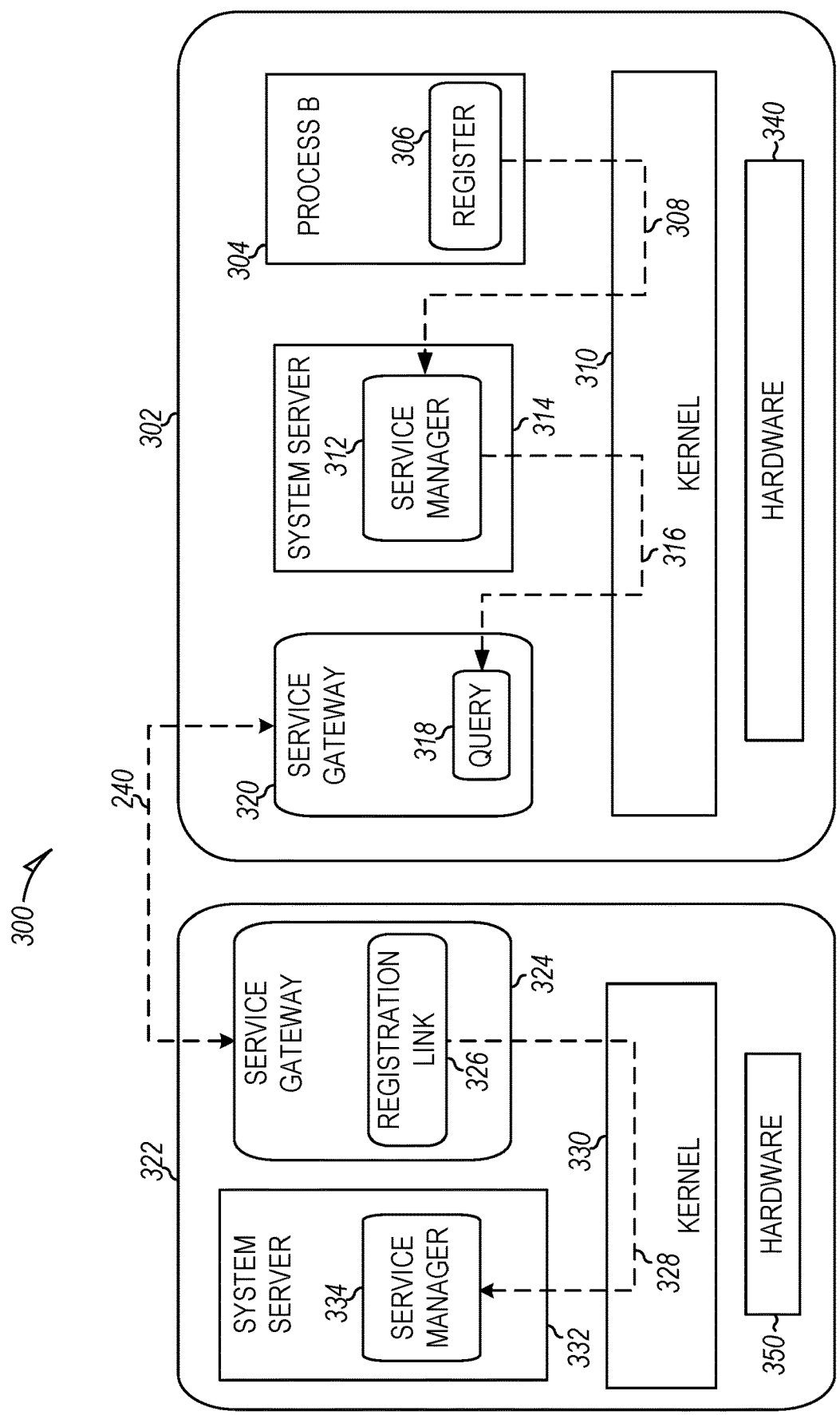

FIG. 3 is a block diagram of a system 300 that implements the protocols for service management across devices according to an example embodiment. These protocols include, without limitation, elements such as data modeling, service publishing, service browsing and/or discovery, and remote messaging and/or execution. FIG. 3 illustrates methods for registering a nominal service on a client device and exposing available services on the server. FIG. 3 includes two mobile devices 302 and 322. Device 302 includes hardware 340 and an OS kernel 310. Similarly, device 322 includes hardware 350 and an OS kernel 330. In this example, process B in container 304 of mobile device 302 has a service that it can provide to other devices in the cluster group. As described above regarding FIG. 1, each mobile device includes a system server. In FIG. 3, device 302 includes system server 314, having a service manager 312, and device 322 includes system server 332, having a service manager 334. Registration link 306 of container 304 uses kernel support 308 to allow process B to register its service with the service manager 312 of the system server 314. The service manager, in turn, uses kernel support 316 to allow a communication service gateway 320 to query the available services. In this embodiment, device 302 advertises its services to device 322. This occurs through a query 318 generated by the communication service gateway 320 and sent via the communication channel 240 (e.g., RPC Service) to the communication service gateway 324 of the client device 322. At the client device 322, once the available services from device 302 have been discovered, the communication service gateway 324 uses register 326 to register the service with the service manager 334 of the system server 332 via kernel support 328 of the client device 322.

Thus, as described above regarding FIG. 1, when a client process on device 322 accesses the service, the IPC tools on device 322 look up the services registered in the service manager 334. When the client process discovers the service is on device 302, a request to access the service is sent through the communication service gateway 324, which uses the communication channel 240 to access the service through the communication service gateway 320 on device 302. FIG. 3 shows an example in which device 302 advertises its services to other devices in the cluster group. Alternatively, device 322 may send a discovery query (not shown) to device 302 to discover the available services. Through service advertising from communication service gateway 320 and/or discovery from the communication service gateway 324, multiple devices can form a cluster group to allow service sharing among the devices in the cluster group. The cluster group can expand or shrink as devices join or leave. As described below, different types of services may be made available by each member of the cluster group to other members of the group. The services typically involve data being transferred between the server device and the client device. Data shared across devices could be simple data, a data reference (e.g. an access reference or a file descriptor), a result of executing a method on the device 302, and/or a database reference, for example. As described in the examples below, different types of data are handled differently based on policy and data property (e.g. size, type, access latency sensitivity, etc.) so the data can be shared and accessed properly across devices.

The system shown in FIG. 3 may include multiple RPC adapters (not shown in FIG. 3), one for each service being accessed on the device 302. In addition, the device 302 may include multiple unassigned RPC adapters (not shown), each including code and data structures used to implement the RPC adapter. When an application running on device 302 exposes a service for use upon a request from other devices, one of these unassigned RPC adapters is assigned to the newly exposed service. Similarly, device 322 may include multiple RPC adapters (not shown in FIG. 3), one for each service accessed by an application running on the device 322. Device 322 may also include multiple unassigned RPC adapters (not shown). The communication service gateway 324 may assign one of these unassigned RPC adapters in response to a request for a service from one of the applications running on the device 322. Typically, each device 302 includes a set number of unassigned RPC adapters. When all of the RPC adapters on the server device are assigned, a device cannot provide any more inter-device services. When all of the RPC adapters on the client device are assigned, the device cannot access any more inter-device services. As described below regarding FIG. 11, when an application ceases to use a service, the RPC adapter associated with that service is returned to the device as an unassigned RPC adapter. Similarly, when an application ceases to provide a service, the RPC adapter associated with that service is returned to the device as an unassigned RPC adapter.

Figure 4:
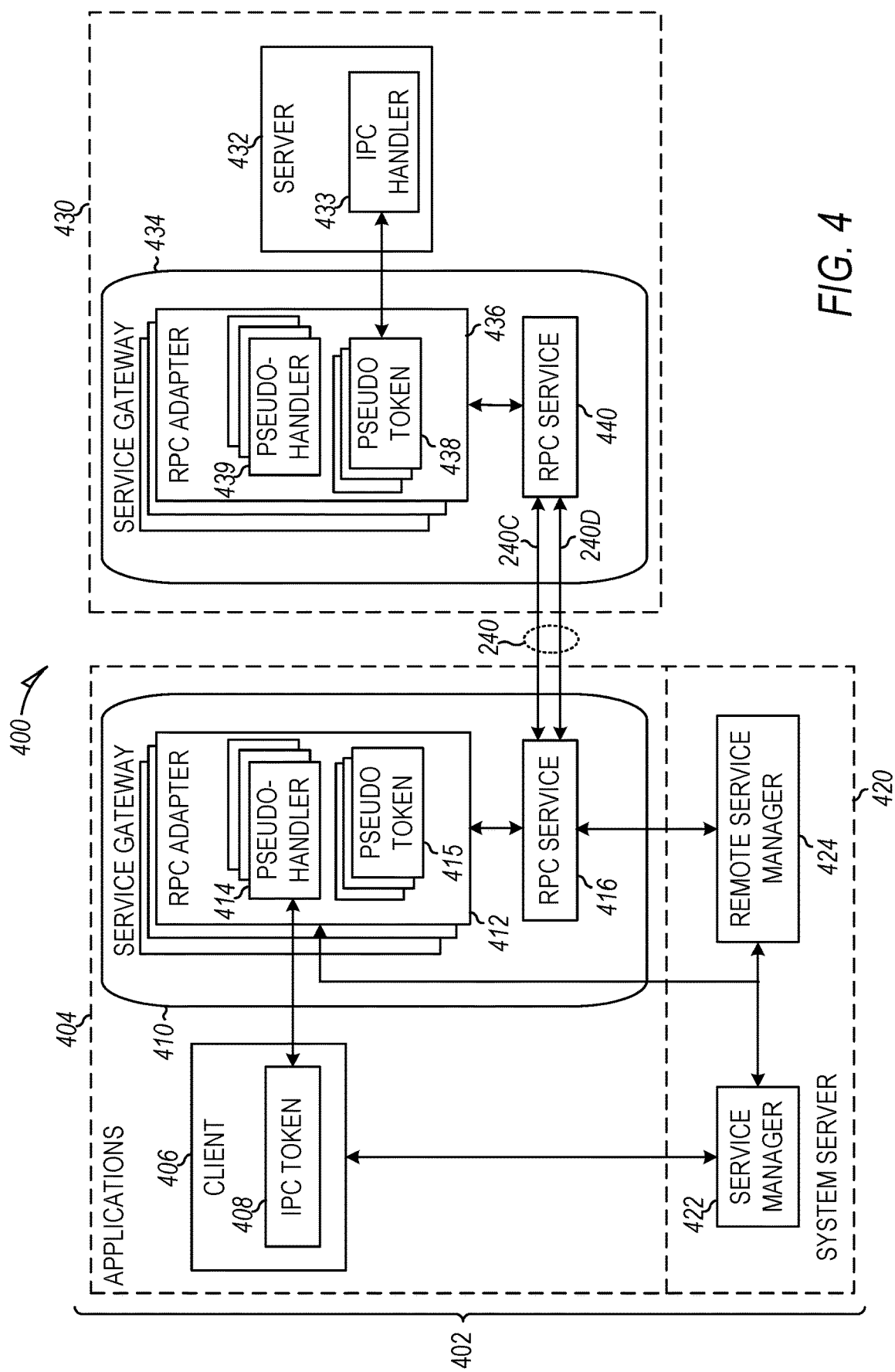

FIG. 4 is a block diagram of a system 400 including an inter-device IPC mechanism according to an example embodiment. The system in FIG. 4 includes a client device 402 and a server device 430. The client device 402 includes applications 404 and a system server 420, which could be part of the OS kernel (not shown). The applications 404 include a client application 406 and a communication service gateway 410. The client application 406 includes an IPC token 408 for a service that is available on the server device 430. In addition, communication service gateway 410 includes an RPC adapter 412 coupled to an RPC service 416. The RPC adapter 412 includes a pseudo-handler 414. The system server 420 of the client device includes a service manager 422 and a remote service manager 424.

The example server device 430 includes a server application 432 having an IPC handler 433 for the available service. The server device 430 also includes a communication service gateway 434, corresponding to the communication service gateway 410 of the client device. The communication service gateway 434 includes an RPC adapter 436 and an RPC service 440. The RPC adapter 436 includes a pseudo-token 438 that corresponds to the pseudo-handler 414 of the client device 402. The two RPC services 416 and 440 are coupled by the communication channel 240. In this example, the communication channel 240 includes a command channel 240C and a data channel 240D. In the example embodiment, both channels 240C and 240D are network socket connections that connect the client device 402 to the server device 430. The operation of the system 400 in establishing a remote IPC channel and using that channel are described below regarding FIGS. 5A and 5B, respectively. Although the example embodiments describe an RPC service using socket connections, it is contemplated that other types of communication services may be used, such as, without limitation, a RESTful API, gRPC, or desktop bus (D-Bus).

As shown in FIG. 4, each device includes one communication service gateway and may include multiple RPC adapters. Each RPC adapter, in turn, may include multiple pseudo-handlers and pseudo-tokens. For example, client device 402 includes communication service gateway 410 that includes multiple RPC adapters such as the RPC adapter 412. RPC adapter 412 includes multiple pseudo-handlers 414 and multiple pseudo-tokens 415. The other RPC adapters may also include multiple pseudo-handlers and/or multiple pseudo-tokens. Similarly, device 430 includes one communication service gateway 434 that includes multiple RPC adapters, such as the RPC adapter 436. Each of the RPC adapters may include multiple pseudo-handlers and/or multiple pseudo-tokens, such as the pseudo-handlers 439 and pseudo-tokens 438 of RPC adapter 436. Each pseudo-handler 414 allows an application running on the client device 402 to access a service on a separate server device, such as the server device 430, where that service is registered on the client device 402 and linked to the RPC adapter 412. Each pseudo-token 415 allows an application running on another device to access a service on the client device 402. Each service is associated with a separate RPC adapter. Multiple applications on the client device 402 may access the same service on the server device 430 using respectively different ones of the pseudo-handlers 414. Similarly, multiple applications running on another device or multiple other devices may access a service on the client device 402 using different ones of the pseudo-tokens 415. The communication service gateway 434, RPC adapters 436, pseudo-handlers 439, and pseudo-tokens 438 operate in the same way as the communication service gateway 410, RPC adapters 412, pseudo-handlers 414, and pseudo-tokens 415.

Figure 5A:
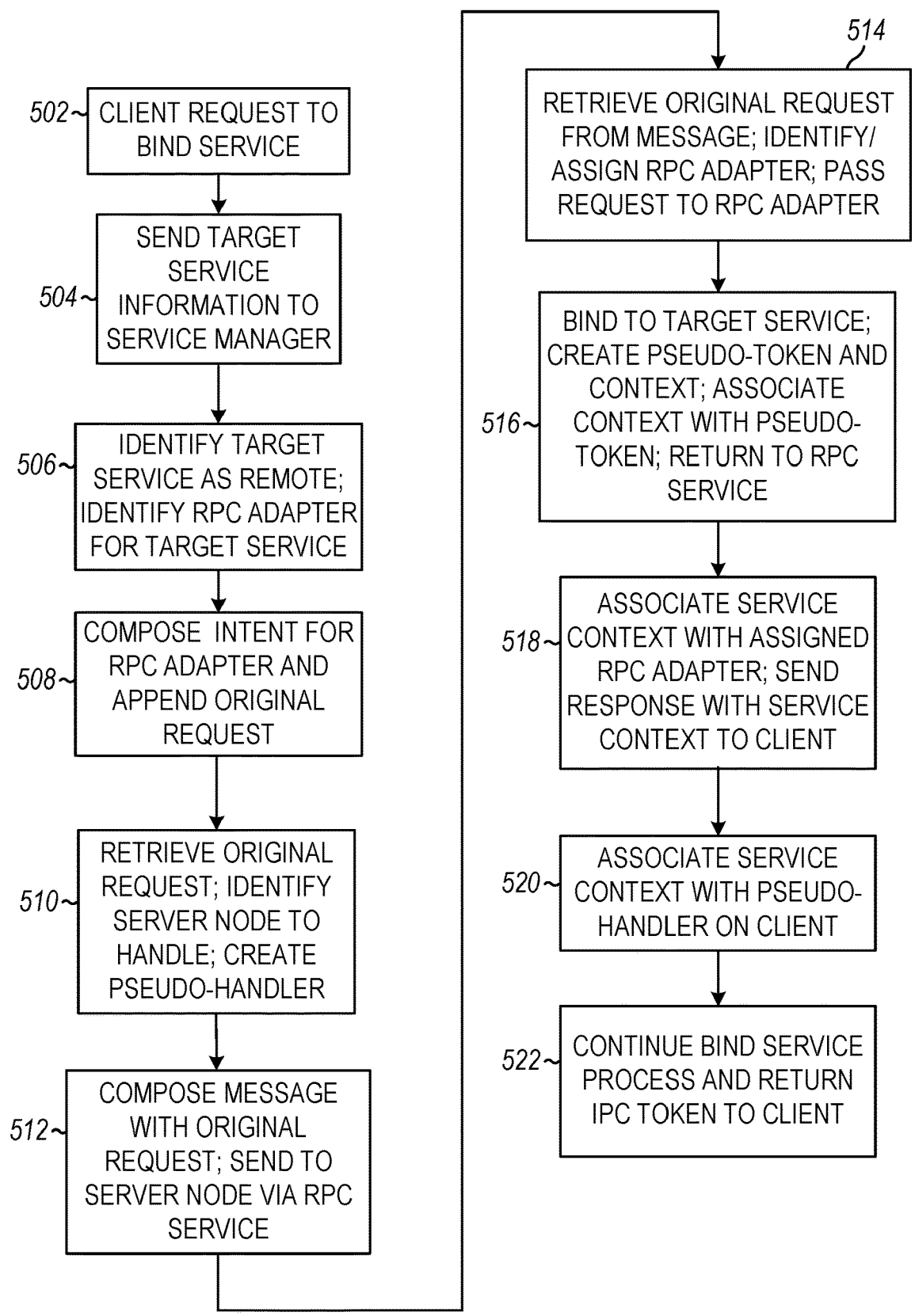
FIG. 5A is a flow-chart diagram illustrating the operation of an inter-device IPC mechanism in establishing a channel for an inter-device IPC call according to an example embodiment.

FIG. 5A is a flow-chart diagram illustrating the operation of the inter-device IPC mechanism in establishing a channel for an inter-device IPC call according to an example embodiment. At operation 502, the client application 406 initiates a request, including an intent and an action, to bind to a target service provided by the server application 432 on the server device 430. At operation 504, the client application 406 sends information (e.g., package name and service name) for the target service to the service manager 422. At operation 506, the service manager 422 provides the information to the remote service manager 424 to determine whether this is a remote service (e.g., a service that is not available on the client device but is available on another device, e.g., the server device 430). If the target service is a remote service, the remote service manager 424 identifies an RPC adapter 412 to handle local access to the remote service. As described above, device 402 may include multiple unassigned RPC adapters 412. When there is no RPC adapter assigned to the remote service, the communication service gateway may assign one of the unassigned RPC adapters 412 to the remote service. When the target service has an assigned RPC adapter 412, the service manager 422, at operation 508, composes an intent for the RPC adapter 412, appends the original request to the intent, and passes the composed intent to the RPC adapter 412. At operation 510, the RPC adapter 412 processes the original request and identifies the server application 432 running on server device 430 as the server to handle the action indicated in the original request. Operation 510 also creates a pseudo-handler 414 to act as the proxy on the client device 402 for the service on the server application 432 of the server device 430. At operation 512, the pseudo-handler 414 of the RPC adapter 412 and communication service gateway 410 compose a message, including the original request, and send the message and associated data to the server device 430 via the RPC service 416, using the communication channel 240.

At operation 514, the RPC service 440 of the server device 430 receives the message and retrieves the original request from the message. Based on the original request, the RPC service 440 either identifies an existing RPC adapter 436, if the target service has been previously accessed or assigns an unassigned RPC adapter to become the RPC adapter 436 when no other device is currently accessing the target service. The RPC service 440 then passes the request to the identified or assigned RPC adapter 436. The RPC adapter 436, at operation 516 binds to the target service and creates a new service context for the target service, and creates a pseudo-token 438. As used herein, the service context provides information about a service including the service ID, service type, and any other relevant information to identify, connect and access the service. In addition, the service context includes relevant information about the device the service is associated with. The RPC adapter 436 associates the service context with pseudo-token 438. Operation 516 returns the service context to the RPC service 440. At operation 518, the communication service gateway 434 associates the service context with the RPC adapter 436, and the RPC service 440 sends a response (with the service context) to the client device 402.

In operation 520, the client device 402 receives the response and passes the response to the RPC adapter 412. The RPC adapter 412 associates the service context with the pseudo-handler 414. In operation 522, the communication service gateway 410 generates an IPC token 408 associated with the pseudo-handler 414 and returns the IPC token 408 to the client application 406. Once the channel is established, the client application 406 may use the IPC token to access the service as described below regarding FIG. 5B.

The service context (SC) includes information identifying the location of the service. In one example, SC includes the address of a server device providing the service and information identifying the service on the server device. Example embodiments map the SC between the client device and the service device to establish the connection to the service. Table 1 describes an example of SC mapping.

TABLE 1

| Map ID | Table | Owner | Note |
|---|---|---|---|
| 1 | map<SC, RPC adapter> | Communication service gateway | When the call reaches the RPC service of the server device, the RPC service uses the service context to identify an RPC adapter that can handle the call. |
| 2 | map<SC, pseudo-token> | RPC adapter | On the server-side, when the call reaches the RPC adapter, the RPC adapter uses the service context to identify a pseudo token to use to invoke an intra-device IPC call. |
| 3 | map<pseudo-handler, SC> | RPC adapter | On the client-side, when the pseudo-handler is invoked, the RPC adapter uses the service context to identify the server providing the service. |

A mapping operation shown in Table 1 is performed when establishing an inter-device IPC (e.g., operation 516 performs Map 2, operation 518 of FIG. 5A performs Map 1, and operation 520 performs Map 3). The mapping operations can also be performed when transferring an IPC token between or among devices, as described below regarding FIGS. 9 and 10.

Figure 5B:
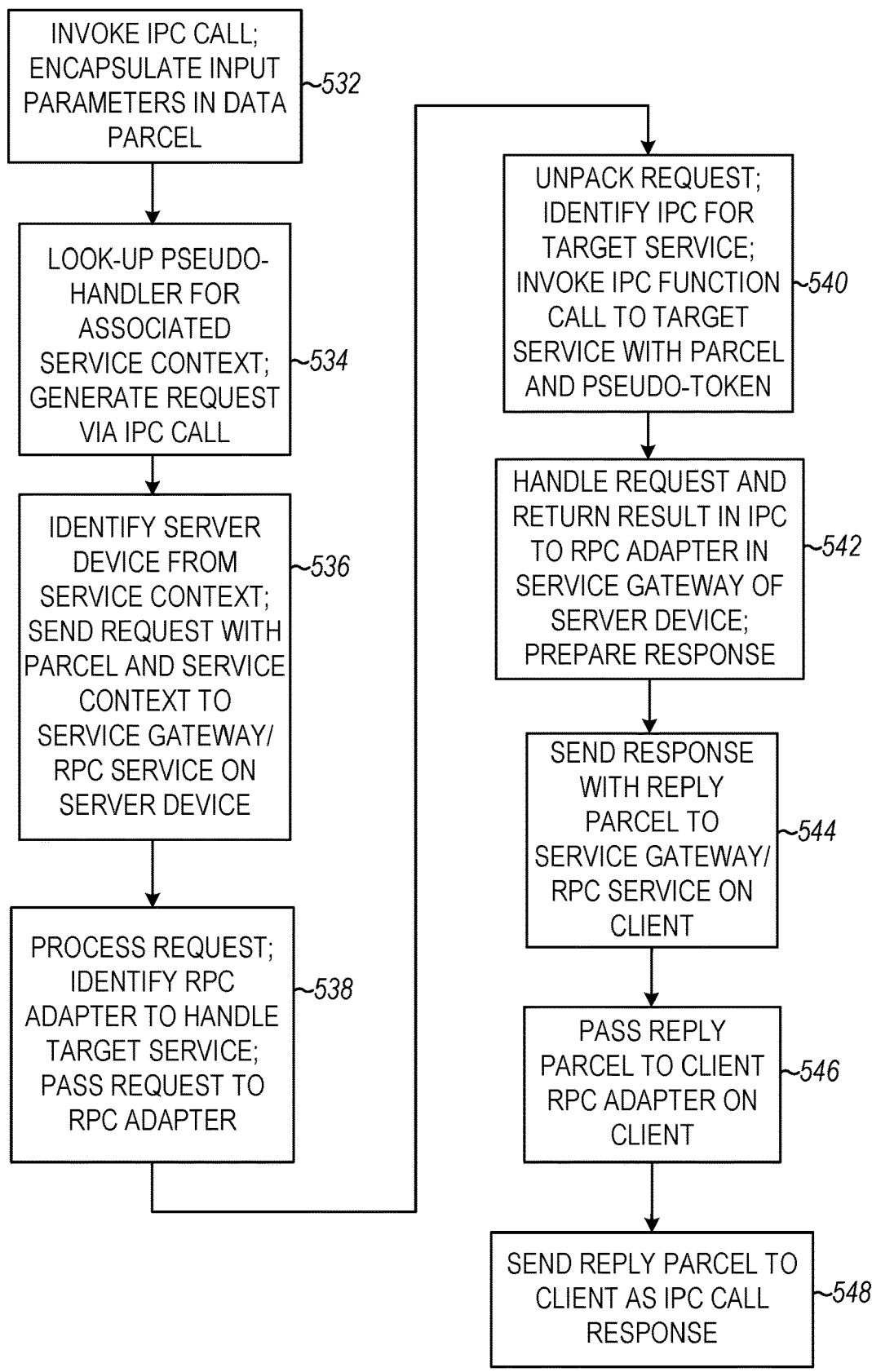
FIG. 5B is a flow-chart diagram showing an application on a client device invoking a remote service via an established inter-device IPC call according to an example embodiment.

FIG. 5B is a flow-chart diagram showing an application on a client device invoking a remote service via an established inter-device IPC link according to an example embodiment. The operations shown in FIG. 5B can be performed using the system shown in FIG. 4. In this embodiment, the service is already bound to the client so the flow-chart shown in FIG. 5B does not reference the system server 420, service manager 422, or remote service manager 424 shown in FIG. 4. At operation 532, the client application 406 invokes an intra-device IPC call and encapsulates input parameters for the call in a data parcel. Using the conventional IPC framework in the OS kernel, operation 534 identifies the pseudo-handler 414 as being associated with the service context and delivers the data parcel, via the IPC token 408, to the identified pseudo-handler 414 in the communication service gateway 410. Operation 534 also generates a request for the RPC service 416 to access the server device 430 and sends the request and the parcel to the RPC service 416. In operation 536, the RPC service 416 identifies the server device 430 from the service context associated with the pseudo handler 414 and sends the request with the parcel and the service context, as an inter-device call, to the RPC service 440 and communication service gateway 434 of the server device 430 using the channel 240. In this instance, the request and the service context are sent via the command channel 240C and, depending on its contents, the associated data is sent via the command channel 240C or the data channel 240D.

In operation 538, the RPC service 440 of the server device 430 receives the request and processes the request to retrieve the service context. Operation 538 uses the service context to identify the RPC adapter 436 to handle the inter-device IPC call. Operation 538 then passes the parcel to the RPC adapter 436 of the communication service gateway 434. At operation 540, the RPC adapter 436 in the communication service gateway 434 decapsulates the request and identifies pseudo-token 438 from the service context. Operation 540 then uses the conventional IPC framework on the server device 430 to call the target service. The IPC framework uses the pseudo-token 438 associated with the request and the parcel to route the call to the target service. At operation 542, the server application 432 receives the request and the parcel, handles the request, and, using the IPC framework, returns the result to the RPC adapter 436 of the communication service gateway 434 as a reply to the inter-device IPC call. The handling of the reply may include generating a reply parcel containing the data to be returned to the client application 406. In operation 544, the communication service gateway 434 and RPC service 440 send the reply with the reply parcel through channel 240 and RPC service 416 to the communication service gateway 410 on the client device 402. The communication service gateway 410, in operation 546, passes the reply parcel to the RPC adapter 412. At operation 548, the RPC adapter 412 sends the reply parcel to the client application 406 using the IPC framework in the kernel of the client device 402 as a response to the intra-device IPC call according to conventional IPC operations.

Figure 6:
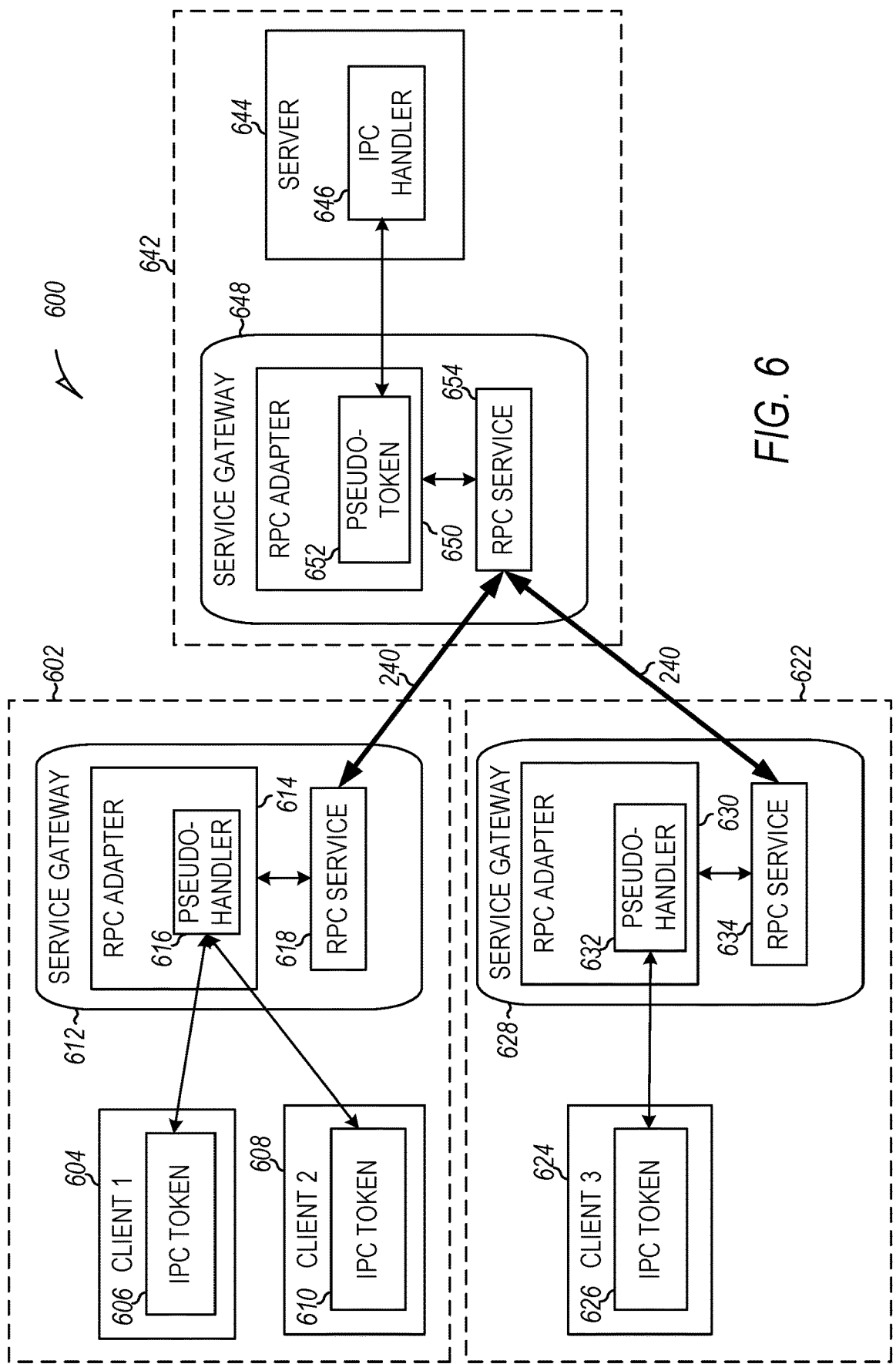
FIG. 6 illustrates a system in which multiple client applications use an inter-device IPC mechanism to bind a common service according to an example embodiment.

FIG. 6 illustrates a system 600 in which multiple client applications use an inter-device IPC mechanism to bind a common service according to an example embodiment. In the example shown in FIG. 6, three client applications 604, 608, and 624 on two client devices 602 and 622, bind a service provided by a server application 644. Client application 604 binds the service through IPC token 606 and client application 608 binds the service through IPC token 610. Both of the IPC tokens 606 and 610 link to the pseudo-handler 616 of the RPC adapter 614 for the service in the communication service gateway 612. Similarly, client application 624 of client device 622 binds the service through IPC token 626, which is linked to pseudo-handler 632 of RPC adapter 630 of the communication service gateway 628 in the client device 622. The RPC adapter 614 sends requests received from client applications 604 and 608 to RPC service 618 for transmission to the server device 642 via channel 240, while RPC adapter 630 sends requests received from client application 624 to the server device 642 via RPC service 634 via channel 240. Both RPC service 618 and RPC service 634 communicate with RPC service 654 of the communication service gateway 648. The RPC service 654, in turn, passes the requests for the service from the client applications 604, 608, and 624 to the RPC adapter 650. The RPC adapter 650 includes the pseudo-token 652, which binds the service on the server device 642 through the IPC handler 646 of the server application 644. Thus, a single communication service gateway 648 on server device 642 may be linked to multiple communication service gateways 612 and 628 on client devices 602 and 622, respectively.

Example embodiments may be used, without limitation, for a device to share and process a file on another device, for a device to prompt a security credential challenge on another device, or for a device to present user interface (UI) elements (e.g., a keyboard) and accept input on another device for remote interaction. Each of these embodiments transfers a different type of data between the client application and the server application.

FIGS. 7, 8, 9, and 10 describe how different types of data are processed and shared between and among the client and server applications using channel 240 according to an example embodiment. The described embodiments handle three types of data transfers: first, when simple data is passed directly via the command channel 240C; second, when a data reference (e.g., an access reference or a file descriptor) is passed via the command channel 240C and data content is passed via data channel 240D; and third when a remote access reference is passed via the command channel 240C.

As described above regarding FIG. 5B, the client device encapsulates the input parameters of an IPC procedure call into a parcel. When a server returns its result, the result is also a parcel that may include parameters or objects. The system processes the objects before transferring the parcel to a remote device. The operation of encapsulating data into a parcel is referred to as marshaling the data into the parcel. Marshaling refers to a process of transforming the memory representation of an object into a data format suitable for storage or transmission. Marshaling is typically used when data must be moved between different parts of a computer program or from one program to another within a single device. As described below regarding FIGS. 7 through 10, the marshaling of objects for inter-device IPC is different than conventional marshaling. Two types of objects can be in the device-independent IPC context. One type of object is an IPC token object. When a sending device processes an IPC token object it converts the IPC token object to the service context and sends the service context to the receiving device. The IPC token object is valid only within the sending device. Another type of object is a data reference (e.g., a File Descriptor (FD)). In an Android context, the FD encapsulated in a parcel could be created for a real file, for Anonymous Shared Memory (ASHMEM), for ION Memory, or a Socket. The FD is only valid within a process. Within a device, when an FD is moved across a process boundary (e.g., to another container), the OS kernel allocates a new FD for the receiving process. When an FD is transferred from one device to another, the FD needs to be processed and translated properly to ensure that the data can still be accessed on the receiving device via an FD reference and that the real data content (e.g., the file content, memory, or socket) is operational (e.g., via local or remote access).

Figure 7:
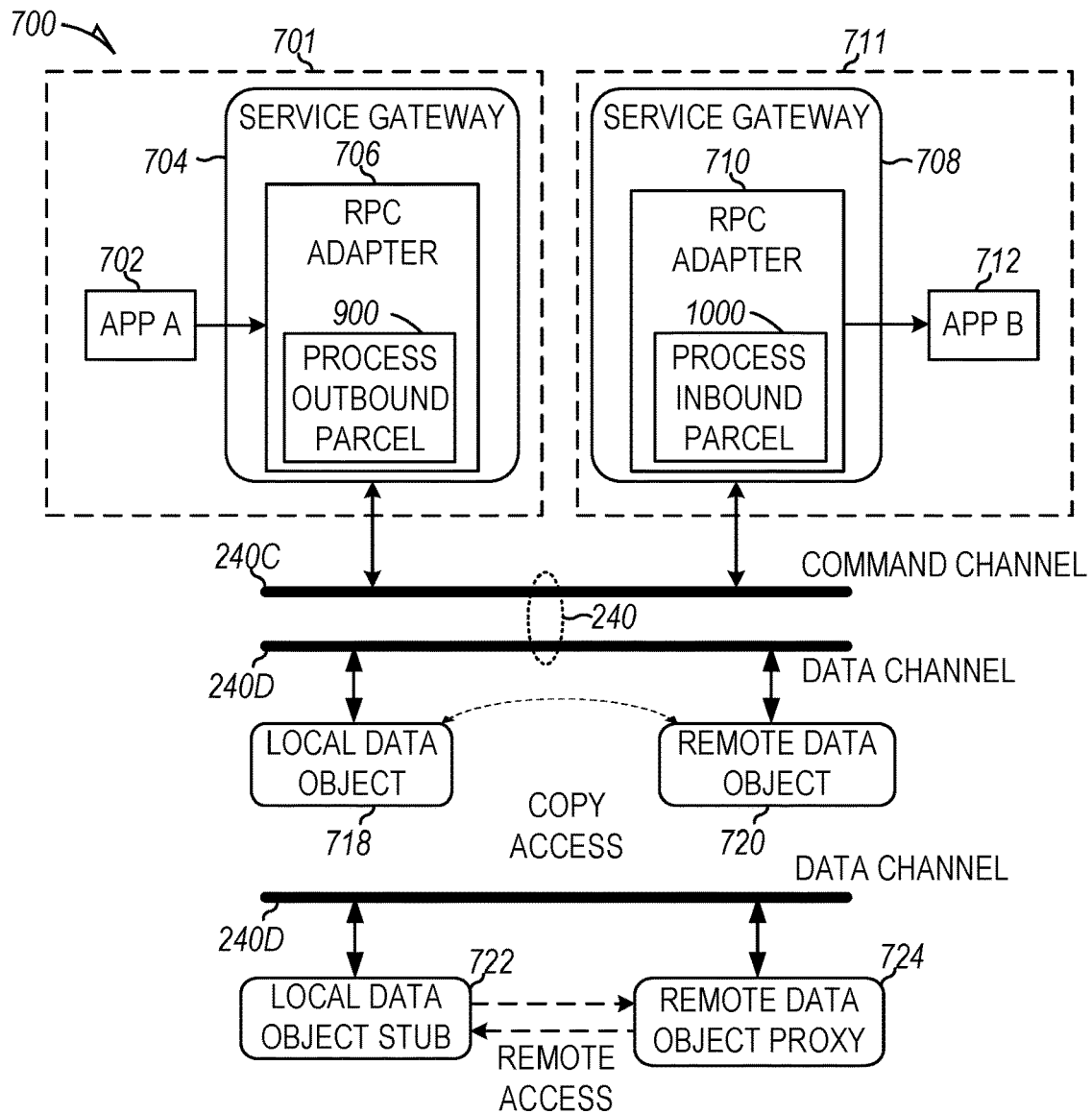
FIG. 7 is a functional block diagram of a system 700 including a communication channel used by a client application to bind a service in a server application.

FIG. 7 is a functional block diagram of a system 700 including a communication channel 240 used by a client application 702 (APP A) of a client device 701 to bind a service in a server application 712 (APP B) of a server device 711. The client application 702 links to an RPC adapter 706 in a communication service gateway 704. As described above, the RPC adapter 706 of the communication service gateway 704 communicates with an RPC adapter 710 of a communication service gateway 708. The server application 712 accesses the RPC adapter 710. The RPC adapters 706 and 710 are coupled, by respective RPC services (not shown in FIG. 7), to the command channel 240C and data channel 240D of the channel 240. The example RPC adapter 706 implements a process outbound parcel method 900 and the example RPC adapter 710 implements a process inbound parcel method 1000. These methods respectively control the generation of outgoing data parcels on sending devices to produce processed outbound parcels and the processing of incoming data parcels on receiving devices by the inter-device IPC mechanism to produce processed inbound parcels. The methods 900 and 1000 are described below regarding FIGS. 9 and 10, respectively. Note that FIG. 7 shows sending parcels from client application 702 and receiving parcels on server application 712. Similar processing applies when sending parcels from server application 712 and receiving parcels on client application 702.

FIG. 7 shows the processing of three different data types. For simple data, the data content is marshaled into a parcel and sent over to command channel 240C. For data suitable for copy access based on policy and properties of the data (e.g. size, type, access latency sensitivity, etc.), the local data object 718 is processed by the RPC adapter 706 and sent over in data channel 240D, while the data reference is marshaled into a parcel and sent over in command channel 240C. When the server device 711 receives the parcel, the RPC adapter 710 creates a corresponding remote data object 720 along with a corresponding data reference updated to reflect remote data object 720. An example of a data object suitable for copy access is a small file. The small file is sent to the server device 711, which creates a corresponding FD to allow data in the small file to be accessed by server application 712. For data not suitable for copy access based on the aforementioned criteria, the RPC adapter 706 creates a local data object stub 722 to represent the data and to send relevant context parameters over the data channel 240D. The RPC adapter 706 marshals the local stub reference into a parcel and sends the parcel over command channel 240C. When the server device 711 receives the parcel and the context parameters, the RPC adapter 710 creates a corresponding remote data object proxy 724, and updates the corresponding stub reference (not shown) to reflect the remote data object proxy 724. The remote data object proxy 724 and local data object stub 722 are RPC enabled components that communicate with each other using a simple socket connection (or other defined communication services such as gRPC, etc.) to allow cross-device data access. An example of a data object not suitable for copy access is a database on the client device 701. Instead of transferring the database from the client device 701 to the server device 711, the system 700 sets up the local data object stub 722 on the client device 701 and the remote data object proxy 724 on the server device 711 to enable remote access of the database.

Figure 8:
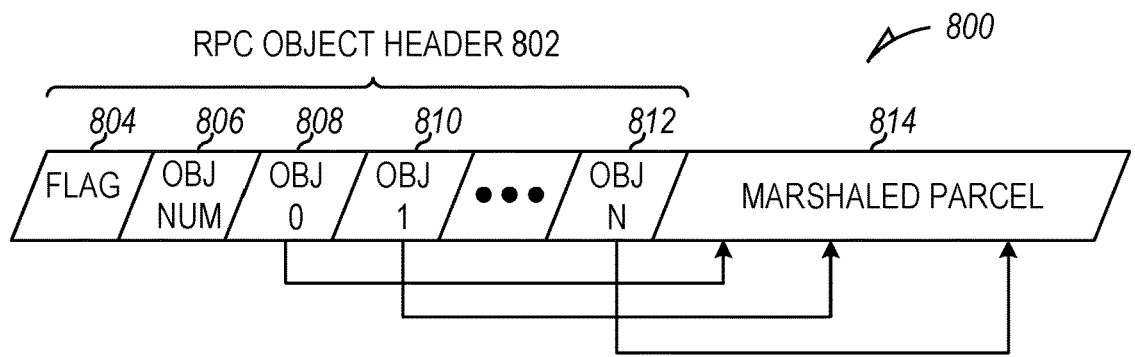
FIG. 8 shows an RPC object parcel according to an example embodiment.

Because existing IPC tools are designed to operate on a single device, the objects transferred between devices are processed differently than currently marshaled data before the parcel is sent to the remote device. FIG. 8 shows an RPC object parcel 800 according to an example embodiment that allows objects to be transferred across device boundaries. The RPC object parcel includes an RPC object header 802 and a marshaled parcel 814. The RPC object header 802 includes a flag field 804 that identifies the parcel as an RPC object parcel and an object number field 806 that includes several marshaled objects in the marshaled parcel 814. The object number field is followed by one or more object pointer fields, 808, 810, and 812. Each of these fields points to a respective marshaled object stored at a respective location in the marshaled parcel 814. As described above, the marshaled object may be a set of data values, an FD, or an IPC object token. RPC object parcels are transferred via the command channel 240C.

Figure 9:
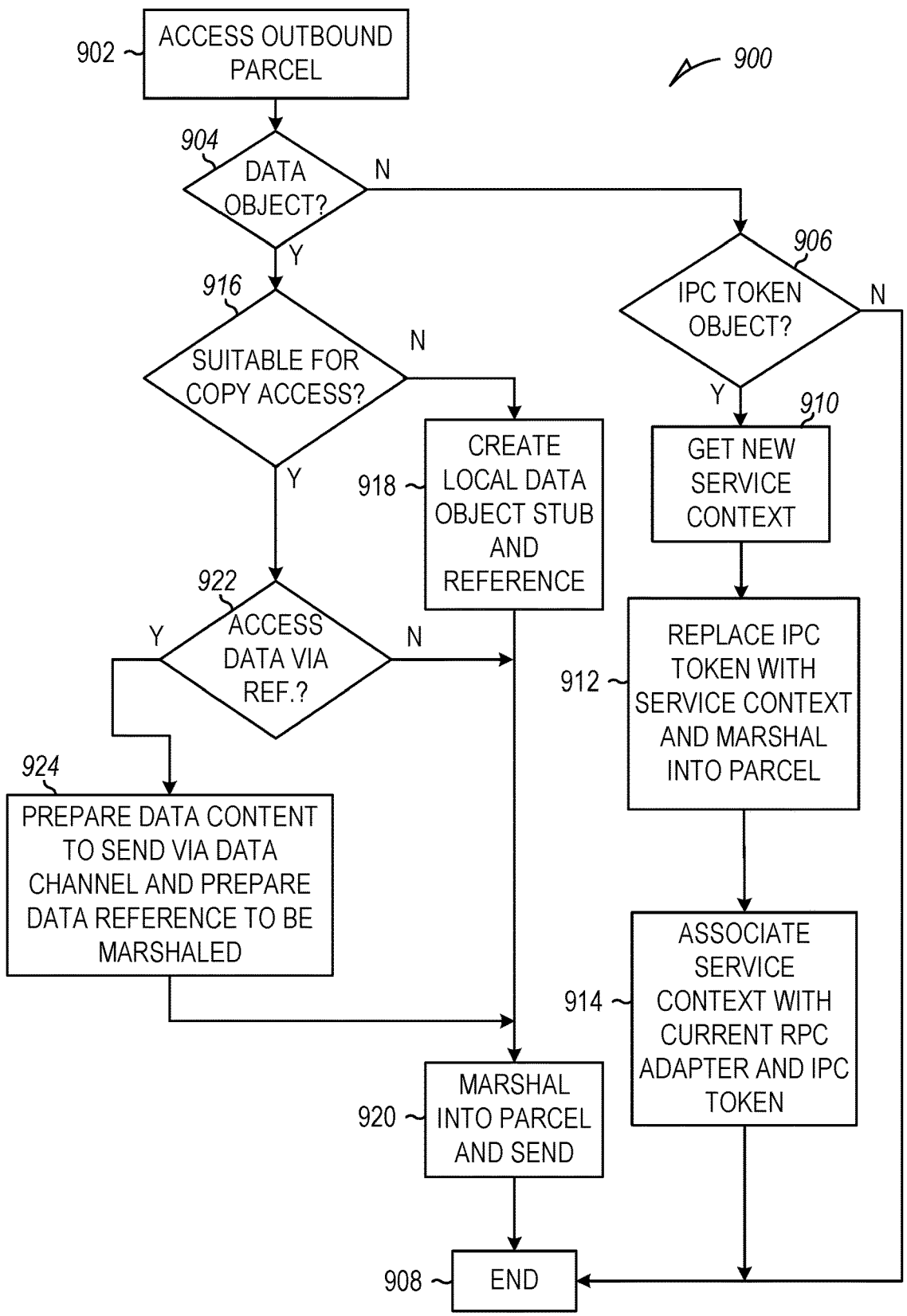
FIG. 9 is a flow-chart diagram of a method for processing an outbound parcel according to an example embodiment.

FIG. 9 is a flow-chart diagram of an example process outbound parcel method 900. The process outbound parcel method 900 is paired with the process inbound parcel method 1000, described below regarding FIG. 10. Although FIG. 7 shows the process outbound parcel method 900 implemented in the client device 701 and the process inbound parcel method 1000 implemented in the server device 711, both the client device 701 and the server device 711 may implement both of the methods 900 and 1000. Intra-device IPC calls may be synchronous or asynchronous. In a synchronous call, the client waits on the IPC call until it receives the response from the server. In an asynchronous call, the client passes an IPC Token to the server and returns immediately from the IPC call without waiting for a response. The server processes the request and then uses the IPC Token to call back the client with the response. The process outbound parcel method 900 and process inbound parcel method 1000 convert the IPC token object to a service context to create a mapping between the server device 711 and the client device 701, thus enabling a cross-device IPC callback mechanism.

As described above regarding FIG. 7, the method 900 is executed by the RPC adapter 706 of the communication service gateway 704. Method 900 is invoked for each object to be placed in the RPC object parcel 800. In operation 902, the RPC adapter 706 accesses an object of an IPC parcel sent from the client application 702 on the client device 701 for inclusion in the RPC object parcel 800, shown in FIG. 8. At operation 904, the RPC adapter 706 of the communication service gateway 704 determines whether the object to be sent is a data object. If the object is not a data object, the RPC adapter 706, at operation 906, determines if the object is an IPC token. When the object is neither a data object nor an IPC token, the method ends at operation 908 and the object is not processed by the process outbound parcel method 900. When the RPC adapter 706, in operation 906, identifies the object as an IPC token, the RPC adapter 706 creates, in operation 910, a new service context for the object and, in operation 912, replaces the IPC token with the service context and marshals the service context into the RPC object parcel 800. In operation 914, the RPC adapter 706 then associates the service context with the current RPC adapter and the IPC Token, and the method ends at operation 908.

When, at operation 904, the RPC adapter 706 determines that an object is a data object, the method 900 continues with operation 916. In operation 916, the RPC adapter 706 determines whether the object is suitable for copy access, that is to say, whether it is suitable to copy the data object to another device based on policy and data property (e.g. size, type, access latency sensitivity, etc.) If yes, method 900 continues with operation 922; otherwise, method 900 continues with operation 918. When copy access is not suitable, the RPC adapter 706 creates, in operation 918, a local data object stub to access the data and, in operation 920, marshals the local data object stub reference into the RPC object parcel 800 to be sent to another device.

When copy access is suitable, the RPC adapter 706 determines, in operation 922, whether the data may be sent directly via the command channel (e.g., the data may be included as a data set in the RPC object parcel 800) or whether the data is to be accessed via a reference (e.g., via an access reference or an FD). When the data is accessed via a reference, the data is sent via a data channel (operation 924), and, in operation 920, the RPC adapter 706 marshals a reference for the data into the RPC object parcel 800. Similarly, when the data is to be sent directly by the command channel, the data object is self-contained so the data set is marshaled into the RPC object parcel 800 in operation 920. After the reference or the data set is marshaled, in operation 920, the method ends at operation 908.

Figure 10:
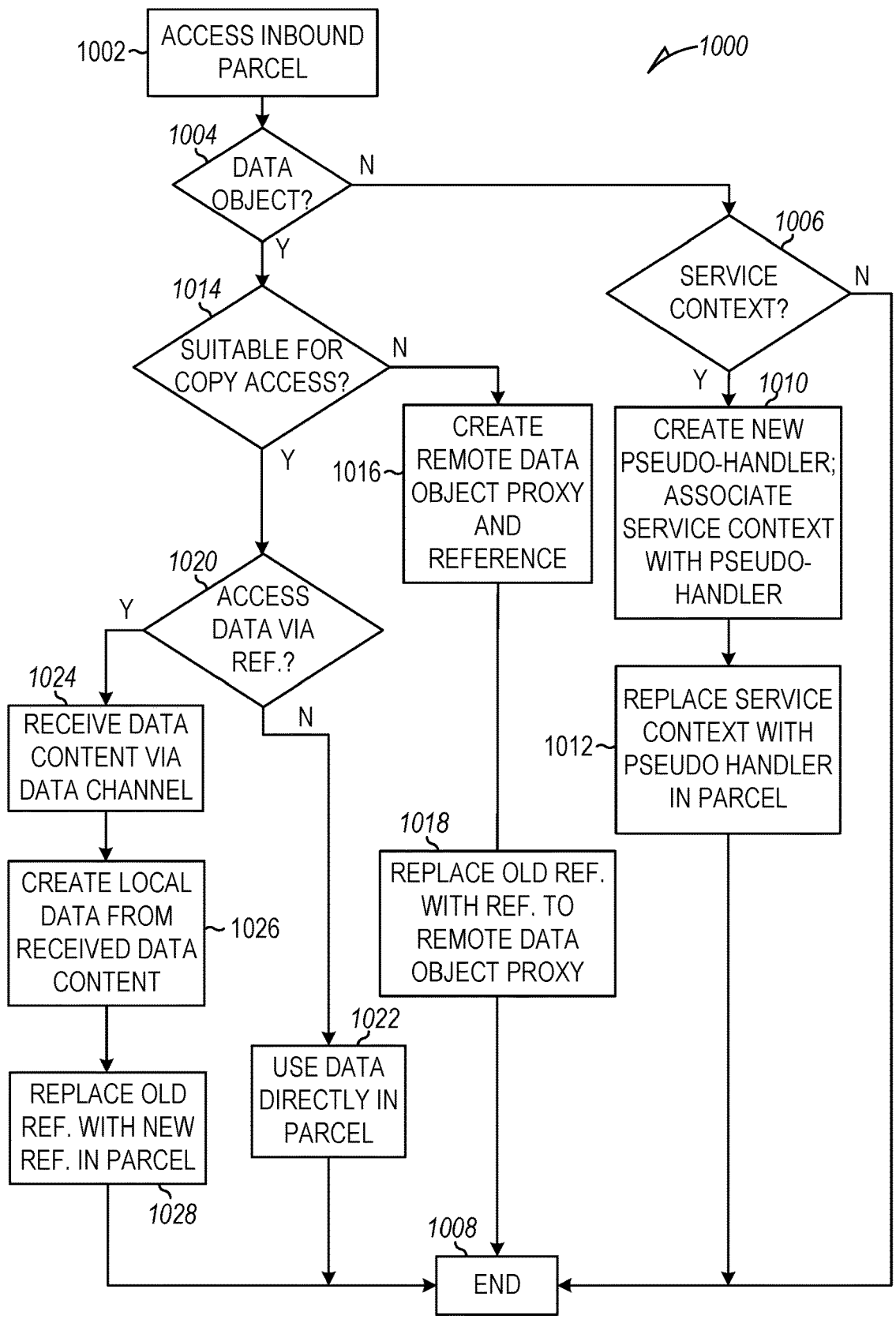
FIG. 10 is a flow-chart diagram of a method for processing an inbound parcel according to an example embodiment.

FIG. 10 is a flow-chart diagram of a process inbound parcel method 1000 according to an example embodiment. Method 1000 may be implemented by the RPC adapter 710 of the communication service gateway 708, shown in FIG. 7. The process inbound parcel method is executed by the RPC adapter 710 for each RPC object in the inbound parcel (e.g., parcel 800, shown in FIG. 8). Method 1000 describes the processing of a single object. It may be executed several times indicated by the object number field 808 of the RPC object parcel 800, shown in FIG. 8. Operation 1002 accesses the inbound RPC object parcel 800 and extracts an object. The RPC adapter 710, at operation 1004, determines whether the object is a data object. When the object is not a data object, the RPC adapter 710, at operation 1006, determines whether the object is a service context for service. When the object is not a data object and is not a service context, the object is not processed and the method 1000 ends as indicated by operation 1008. When the RPC adapter 710, at operation 1006, determines that the extracted object is a service context, the RPC adapter 710, at operation 1010, creates a new pseudo-handler for the object based on the extracted service context and associates the service context with the pseudo-handler. At operation 1012, the RPC adapter 710 replaces the service context in the RPC object parcel 800 with the pseudo-handler.

When, at operation 1004, the RPC adapter 710 determines that an object is a data object, the RPC adapter 710, at operation 1014, determines whether the object is suitable for copy access. When the object is not suitable for copy access, the RPC adapter 710, at operation 1016, creates a remote data object proxy based on received context parameters, and, at operation 1018, updates the reference in the RPC object parcel 800 with the remote data object proxy. After operation 1018, the method 1000 ends. When the RPC adapter 710, at operation 1014, determines that the object is suitable for copy access, the RPC adapter 710, at operation 1020, determines whether the data is to be accessed directly or via a reference. When the data is to be accessed directly, the data object is self-contained within the RPC object parcel 800, the RPC adapter 710, at operation 1022, passes the data in the RPC object parcel 800 to the destination application, and the method 1000 ends at operation 1008. When, at operation 1020, the RPC adapter 710 determines that the data is to be accessed via a reference, the RPC adapter 710 receives data content via the data channel at operation 1024, for example, the RPC adapter 710 receives the data content from the data channel 240D and stores the data locally. At operation 1026, the RPC adapter 710 creates a local reference for the received data content and, at operation 1028, updates the reference in the RPC object parcel 800 with the newly created reference. After updating the reference, the method 1000 ends at operation 1008.

Figure 11:
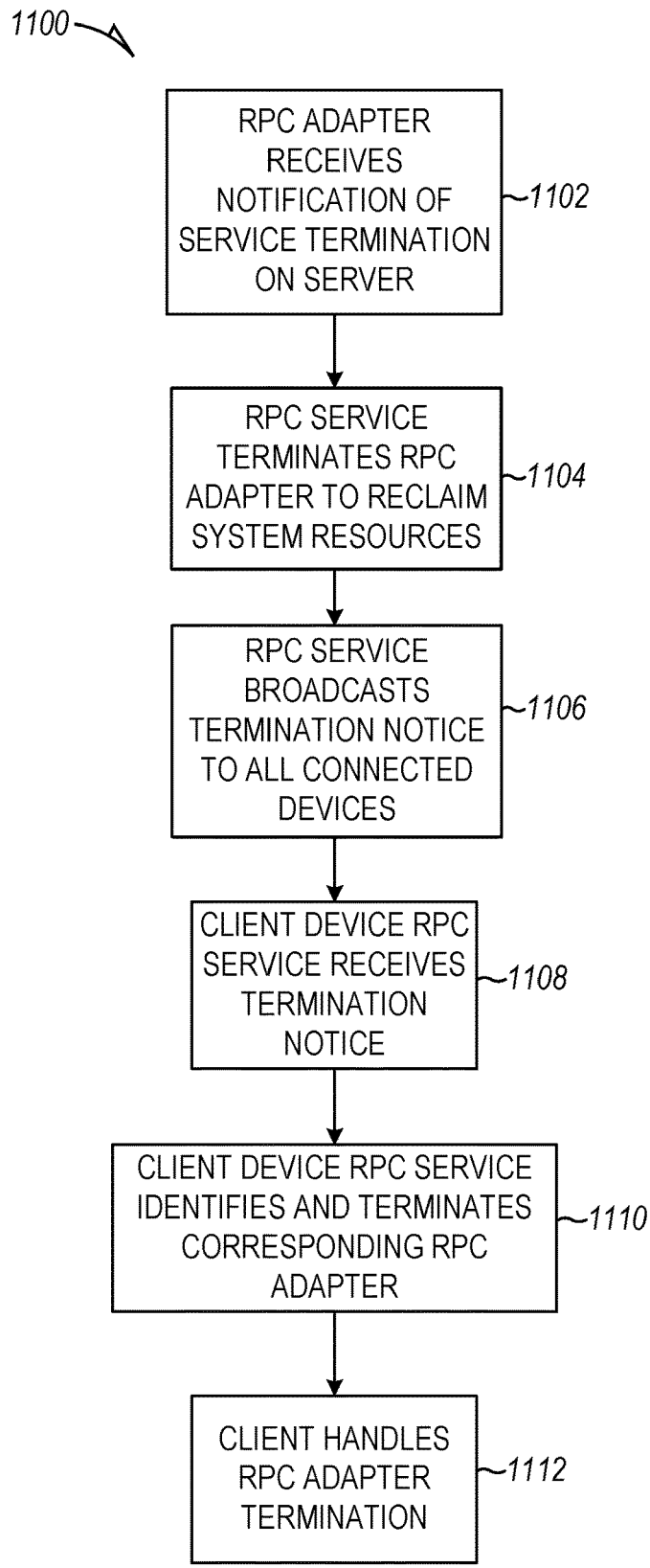
FIG. 11 is a flow-chart diagram showing an example method for terminating an inter-device IPC service and reclaiming the inter-device IPC structure according to an example embodiment.

FIG. 11 is a flow-chart diagram showing an example method 1100 for reclaiming the inter-device IPC structure when a corresponding IPC service is terminated. FIG. 11 may be invoked when a server leaves a cluster group or terminates a service so that the inter-device IPC structure (e.g., the communication service gateways) supporting access to the service are reclaimed for possible use by other inter-device IPC services. Regarding FIG. 6, at operation 1102, the RPC adapter 650 on the server device 642 receives the notification of termination of the service. At operation 1104, the RPC service 654 coupled to the RPC adapter 650 then terminates the RPC adapter 650 to reclaim the system resources. The RPC service 654, at operation 1106, then broadcasts a termination notification to the connected client devices 602 and 622. After broadcasting the termination notification, the RPC service 654 clears the RPC adapter 650 of the pseudo-token 652 and returns the RPC adapter 650 to the pool of unassigned RPC adapters.

The RPC service of each client device, for example, RPC service 618 of client device 602, receives the termination notification at operation 1108. The client device 602, at operation 1110, then identifies the RPC adapter 614 corresponding to the terminated service and terminates the adapter 614 to reclaim system resources on the client device (e.g., to return the RPC adapter 614 to the pool of unassigned RPC adapters). The termination of the RPC adapter includes notifying the client applications 604 and 608 of the termination. At operation 1112, the client applications 604 and 608 handle the termination by deleting the corresponding IPC tokens 606 and 610.

Figure 12:
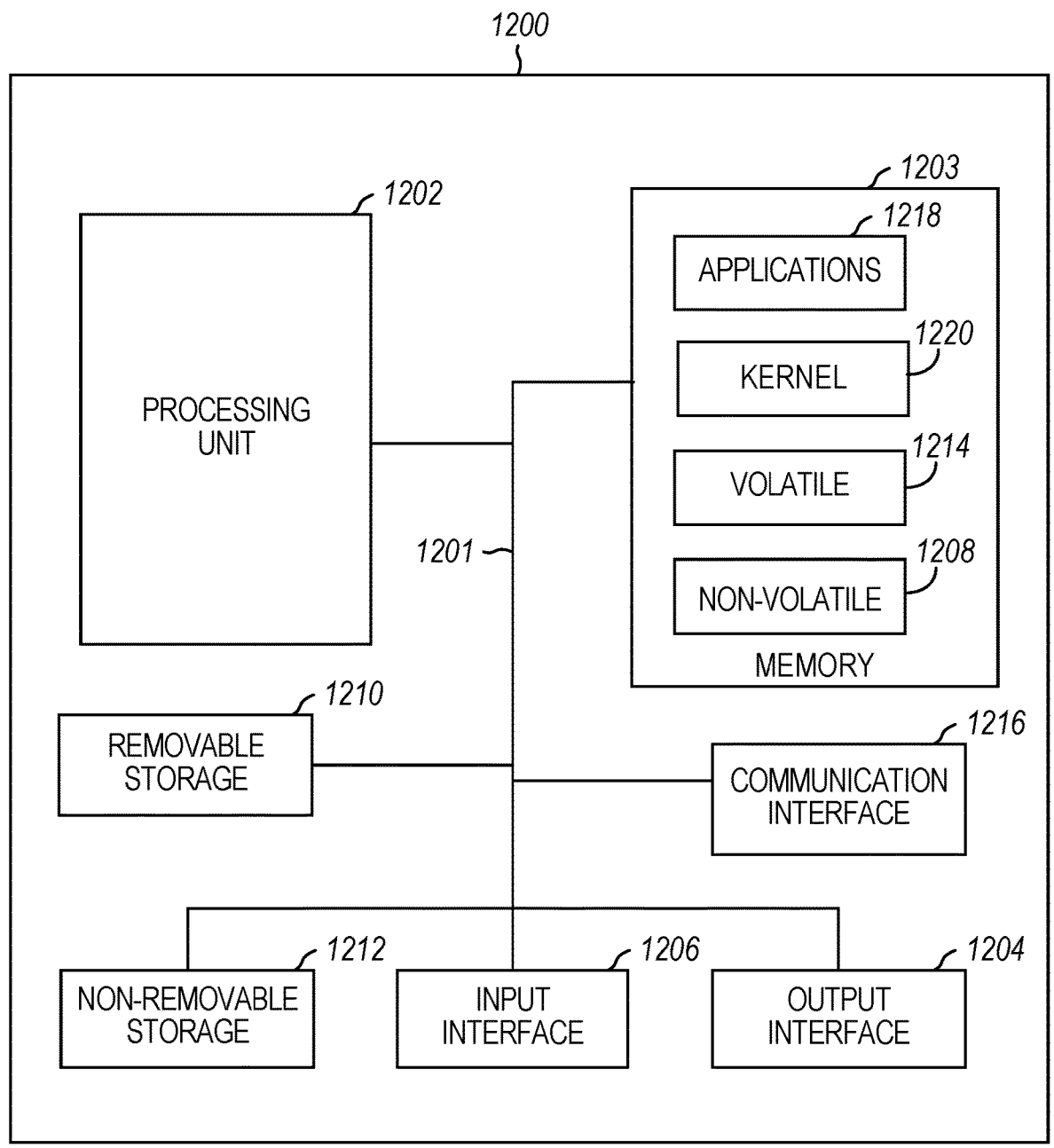
FIG. 12 is a block diagram of a computing device according to an example embodiment.

FIG. 12 is a block diagram of a computing device 1200 according to an embodiment. Similar components may be used in the example computing devices described herein. For example, the clients, servers, and network resources may each use a different set of the components shown in FIG. 12 and/or computing components not shown in FIG. 12. Computing devices similar to computing device 1200 may be used to implement client and/or server devices shown in FIGS. 2-4, 6, and 7.

One example computing device 1200 may include a processing unit 1202 (e.g., one or more processors and/or CPUs), memory 1203, removable storage 1210, and non-removable storage 1212 communicatively coupled by a bus 1201. Although the various data storage elements are illustrated as part of the computing device 1200.

Memory 1203 may include volatile memory 1214 and/or non-volatile memory 1208. Computing device 1200 may include or have access to a computing environment that includes a variety of computer-readable media, such as volatile memory 1214, non-volatile memory 1208, removable storage 1210, and/or non-removable storage 1212. Computer storage includes random access memory (RAM), read-only memory (ROM), erasable programmable read-only memory (EPROM), electrically erasable programmable read-only memory (EEPROM), flash memory or other memory technologies, compact disc read-only memory (CD-ROM), digital versatile disk (DVD) or other optical disk storage devices, magnetic cassettes, magnetic tape, magnetic disk storage or other magnetic storage devices, or any other medium capable of storing computer-readable instructions. The memory 1203 also includes program instructions for the OS kernel 1220 and applications 1218 that, either alone or in concert with other devices, implement any of the methods and/or algorithms described above.

Computing device 1200 may include or have access to a computing environment that includes an input interface 1206, output interface 1204, and communication interface 1216. Output interface 1204 may provide an interface to a display device, such as a touchscreen, that also may serve as an input device. The input interface 1206 may provide an interface to one or more of the touchscreen, a touchpad, a mouse, a keyboard, a camera, one or more device-specific buttons, one or more sensors integrated within or coupled via wired or wireless data connections to the server computing device 1200, and/or other input devices. The input interface 1206 and output interface 1204 may provide input and output interfaces to other types of devices such as, without limitation, video streaming devices, Internet of things (IoT) devices, wearable devices, or augmented reality (AR) devices. The computing device 1200 may operate in a networked environment using a communication interface 1216. The communication interface may include one or more of an interface to a local area network (LAN), a wide area network (WAN), a cellular network, a WLAN network, and/or a Bluetooth® network. The computing device 1200 uses a communication interface to establish the communication channel 240, including the command channel 240C and data channel 240D with one or more other computing devices.

In an example embodiment, the computing device 1200 includes a request module obtaining a first request to bind a first object from an application running on the first device, an object determination module determining that the first object is a remote object on a second device, a message generation module generating a message including the first request, a message transmission module providing the message to the second device via a communication service gateway on the first device, a service context module obtaining a first service context for the first object from the second device as a response to the first request to bind the first object, a pseudo-handler module creating a first pseudo-handler, an association module associating the first service context with the first pseudo-handler in the communication service gateway, and a token module providing a first IPC token corresponding to the first pseudo-handler to the application on the first device. In some embodiments, the computing device 1200 may include other or additional modules for performing any one of or combination of steps described in the embodiments. Further, any of the additional or alternative embodiments or aspects of the method, as shown in any of the figures or recited in any of the claims, are also contemplated to include similar modules.

Any one or more of the modules (e.g., programs, methods, and/or processes) described herein may be implemented using hardware (e.g., a processor of a machine, an application-specific integrated circuit (ASIC), field-programmable gate array (FPGA), or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. As described herein, a module can comprise one or both of hardware or software that has been designed to perform a function or functions (e.g., one or more of the functions described herein in connection with providing secure and accountable data access).

Although a few embodiments have been described in detail above, other modifications are possible. For example, the flow charts depicted in the FIGS. 5A, 5B, 9, and 10 do not require the particular order shown, or sequential order, to achieve desirable results. Other steps may be provided, or steps may be eliminated, from the described flows, and other components may be added to, or removed from, the described systems. Other embodiments may be within the scope of the following claims.

It should be further understood that software including one or more computer-executable instructions that facilitate processing and operations as described above regarding any one or all of the steps of the disclosure can be installed in and provided with one or more computing devices consistent with the disclosure. Alternatively, the software can be obtained and loaded into one or more computing devices, including obtaining the software through a physical medium or distribution system, including, for example, from a server owned by the software creator or from a server not owned but used by the software creator. The software can be stored on a server for distribution over the Internet, for example.

Also, it will be understood by one skilled in the art that this disclosure is not limited in its application to the details of construction and the arrangement of components outlined in the description or illustrated in the drawings. The embodiments herein are capable of other embodiments and capable of being practiced or carried out in various ways. Also, it will be understood that the phraseology and terminology used herein are for description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The components of the illustrative devices, systems, and methods employed following the illustrated embodiments can be implemented, at least in part, in digital electronic circuitry or computer hardware, firmware, software, or combinations of them. These components can be implemented, for example, as a computer program product such as a computer program, program code, or computer instructions tangibly embodied in an information carrier, or a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, method, object, or another unit suitable for use in a computing environment. A computer program can be deployed to be executed on one computer or multiple computers at one site or distributed across multiple sites and interconnected by a communication network. Method operations associated with the illustrative embodiments can be performed by one or more programmable processors executing a computer program, code, or instructions to perform functions (e.g., by operating on input data and/or generating an output). Method operations can also be performed by, and an apparatus for performing the methods can be implemented as, special purpose logic circuitry, for example, as an FPGA (field-programmable gate array) or an ASIC (application-specific integrated circuit), for example.

The various illustrative logical blocks, modules, and circuits described in connection with the embodiments disclosed herein may be implemented or performed with a general-purpose processor, a digital signal processor (DSP), an ASIC, an FPGA, or other programmable logic devices, discrete gate or transistor logic, discrete hardware components, or any combination thereof designed to perform the functions described herein. A general-purpose processor may be a single-core or multi-core microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random-access memory or both. The elements of a computer include a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, for example, electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by, or incorporated into special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, "machine-readable medium" or "computer-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term machine-readable medium or computer-readable medium should be taken to include a single medium or multiple media (e.g., a centralized or distributed database, or associated caches and servers) able to store processor instructions. A machine-readable medium or computer-readable medium shall also be taken to include any medium (or a combination of multiple media) that is capable of storing instructions for execution by one or more processors, such that the instructions, when executed by one or more processors, cause the one or more processors to perform any one or more of the methodologies described herein. Accordingly, a machine-readable medium or computer-readable medium refers to a single storage apparatus or device, as well as "cloud-based" storage systems or storage networks that include multiple storage apparatus or devices. The terms "machine-readable medium" and "computer-readable medium" as used herein exclude signals per se.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the scope disclosed herein.

Although the present disclosure has been described regarding specific features and embodiments thereof, it is evident that various modifications and combinations can be made thereto without departing from the scope of the disclosure. For example, other components may be added to, or removed from, the described methods, modules, devices, and/or systems. The specification and drawings are, accordingly, to be regarded simply as an illustration of the disclosure as defined by the appended claims, and are contemplated to cover any modifications, variations, combinations, or equivalents that fall within the scope of the present disclosure. Other aspects may be within the scope of the following claims.

What is claimed is:

1. A first device comprising:
a memory storing instructions; and
at least one processor in communication with the memory, the at least one processor configured, upon execution of the instructions, to perform the following steps:
obtaining, from a second device and via a communication service gateway of the first device, a first request to bind a first object on the first device;
assigning a first pseudo-token for the first object to the communication service gateway;
creating a first service context for the first object;
associating the first service context with the first pseudo-token for the first object; and
providing the first service context to the second device via the communication service gateway as a response to the first request to bind the first object.

2. The first device of claim 1, wherein the at least one processor further executes the instructions to perform the steps of:
obtaining, from the second device and via the communication service gateway of the first device, an inter-device inter-process communication (IPC) call and the first service context associated with the first object;
identifying the first pseudo-token as being associated with the first service context;
obtaining an inbound parcel including input parameters for the inter-device IPC call;
processing the inbound parcel to provide a processed inbound parcel for use by an intra-device IPC call;
initiating the intra-device IPC call with the processed inbound parcel for the first object using the first pseudo-token;
obtaining a reply to the intra-device IPC call, the reply including an outbound parcel;
processing the outbound parcel to provide a processed outbound parcel for use with a response to the inter-device IPC call; and
providing the processed outbound parcel to the second device via the communication service gateway with the response to the inter-device IPC call.

3. The first device of claim 1, wherein the at least one processor further executes the instructions to perform the steps of:
obtaining a second request to bind a second object from an application running on the first device;
determining that the second object is a remote object on a second device;
generating a message including the second request;
providing the message to the second device via the communication service gateway on the first device;
obtaining a second service context for the second object from the second device as a response to the second request to bind the second object;
creating a first pseudo-handler for the second object;
associating the second service context with the first pseudo-handler in the communication service gateway on the first device; and
providing an IPC token corresponding to the first pseudo-handler to the application on the first device.

4. The first device of claim 3, wherein the at least one processor further executes the instructions to perform the steps of:
obtaining, from the application running on the first device, an intra-device IPC call for the second object on the second device;
invoking the first pseudo-handler in the communication service gateway;
identifying the second service context associated with the first pseudo-handler;
obtaining an outbound parcel including input parameters for an inter-device IPC call;
processing the outbound parcel to provide a processed outbound parcel for use with the inter-device IPC call;
providing the inter-device IPC call with the processed outbound parcel and the second service context to the second device via the communication service gateway;
obtaining, from the second device and via the communication service gateway, a reply to the inter-device IPC call, the reply including an inbound parcel;
processing the inbound parcel to provide a processed inbound parcel; and
providing the processed inbound parcel to the application as a reply to the intra-device IPC call.

5. The first device of claim 1, wherein the at least one processor further executes the instructions to perform the steps of:
obtaining, from a third device and via the communication service gateway of the first device, a third request to bind a third object on the first device;
assigning a second pseudo-token for the third object to the communication service gateway;
creating a third service context for the third object;
associating the third service context with the second pseudo-token for the third object; and
providing the third service context to the third device via the communication service gateway as a response to the third request to bind the third object.

6. The first device of claim 5, wherein the at least one processor further executes the instructions to perform the steps of:
obtaining, from a third device and via the communication service gateway of the first device, a second request to bind the first object on the first device; and
providing the first service context to the third device via the communication service gateway as a response to the second request to bind the first object.

7. The first device of claim 6, wherein the third device includes the second device.

8. A first device comprising:
a memory storing instructions; and
at least one processor in communication with the memory, the at least one processor configured, upon execution of the instructions, to perform the following steps:
obtaining a first request to bind a first object from an application running on the first device;
determining that the first object is a remote object on a second device;

generating a message including the first request;
providing the message to the second device via a communication service gateway on the first device;
obtaining a first service context for the first object from the second device as a response to the first request to bind the first object;
creating a first pseudo-handler;
associating the first service context with the first pseudo-handler in the communication service gateway; and
providing a first IPC token corresponding to the first pseudo-handler to the application on the first device.

9. The first device of claim 8, wherein the at least one processor further executes the instructions to perform the steps of:
obtaining, from the application running on the first device, an intra-device IPC call for the first object on the second device;
invoking the first pseudo-handler in the communication service gateway;
identifying the first service context associated with the first pseudo-handler on the first device;
obtaining an outbound parcel including input parameters for an inter-device IPC call;
processing the outbound parcel to provide a processed outbound parcel for use with the inter-device IPC call;
providing the inter-device IPC call with the processed outbound parcel and the first service context to the second device via the communication service gateway;
obtaining, from the second device and via the communication service gateway, a response to the inter-device IPC call, the response including an inbound parcel;
processing the inbound parcel to provide a processed inbound parcel for use with a reply to the intra-device IPC call; and
providing the processed inbound parcel to the application with the reply to the intra-device IPC call.

10. The first device of claim 8, wherein the at least one processor further executes the instructions to perform the steps of:
obtaining, from the application, a second request to bind a second object;
determining that the second object is a remote object on a third device;
generating a message including the second request;
providing the message to the third device via the communication service gateway on the first device;
obtaining a second service context for the second object from the third device as a response to the second request to bind the second object;
creating a second pseudo-handler;
associating the second service context with the second pseudo-handler in the communication service gateway; and
providing a second IPC token corresponding to the second pseudo-handler to the application on the first device.

11. The first device of claim 10, wherein the third device includes the second device.

12. The first device of claim 11, wherein the at least one processor further executes the instructions to perform the steps of:
obtaining a second request to bind the first object from a second application running on the first device;
determining that the first object is a remote object on the second device;
identifying the first pseudo-handler for the first object; and
providing a second IPC token corresponding to the first pseudo-handler to the second application on the first device.

13. The first device of claim 9, wherein the operation of processing the outbound parcel comprises:
identifying a marshaled object in the outbound parcel;
determining that the marshaled object references a local data object outside of the outbound parcel;
creating a local data object stub for the marshaled object and a reference to the local data object stub; and
marshaling the reference to the local data object stub into the processed outbound parcel as a replacement for the marshaled object.

14. The first device of claim 9, wherein the processing the outbound parcel comprises:
identifying a marshaled object in the outbound parcel;
determining that the marshaled object is a data descriptor for data values outside of the outbound parcel;
creating a reference to the data descriptor; and
marshaling the reference to the data descriptor into the processed outbound parcel as a replacement for the marshaled object.

15. A method performed by a first device comprising:
obtaining a first request to bind a first object from an application running on the first device;
determining that the first object is a remote object on a second device;
generating a message including the first request;
providing the message to the second device via a communication service gateway on the first device;
obtaining a first service context for the first object from the second device as a response to the first request to bind the first object;
creating a first pseudo-handler;
associating the first service context with the first pseudo-handler in the communication service gateway; and
providing a first IPC token corresponding to the first pseudo-handler to the application on the first device.

16. The method of claim 15, further comprising:
obtaining, from the application running on the first device, an intra-device IPC call for the first object on the second device;
invoking the first pseudo-handler in the communication service gateway;
identifying the first service context associated with the first pseudo-handler on the first device;
obtaining an outbound parcel including input parameters for an inter-device IPC call;
processing the outbound parcel to provide a processed outbound parcel for use with the inter-device IPC call;
providing the inter-device IPC call with the processed outbound parcel and the first service context to the second device via the communication service gateway;
obtaining, from the second device and via the communication service gateway, a response to the inter-device IPC call, the response including an inbound parcel;
processing the inbound parcel to provide a processed inbound parcel for use with a reply to the intra-device IPC call; and
providing the processed inbound parcel to the application with the reply to the intra-device IPC call.

17. The method of claim 16, further comprising:
obtaining a second request to bind the first object from a second application running on the first device;
determining that the first object is a remote object on the second device;

identifying the first pseudo-handler for the first object; and providing a second IPC token corresponding to the first pseudo-handler to the second application on the first device.

18. The method of claim 16, wherein the processing of the outbound parcel comprises:

identifying a marshaled object in the outbound parcel;

determining that the marshaled object references a local data object outside of the outbound parcel;

creating a local data object stub for the marshaled object and a reference to the local data object stub; and marshaling the reference to the local data object stub into the processed outbound parcel as a replacement for the marshaled object.

19. The method of claim 16, wherein the processing of the outbound parcel comprises:

identifying a marshaled object in the outbound parcel;

determining that the marshaled object is a data descriptor for data values outside of the outbound parcel;

creating a reference to the data descriptor; and marshaling the reference to the data descriptor into the processed outbound parcel as a replacement for the marshaled object.

20. The method of claim 16, wherein the processing of the inbound parcel comprises:

identifying a marshaled object in the inbound parcel;

determining that the marshaled object is a reference to a remote data object stub;

creating a remote data object proxy linked to the remote data object stub to allow remote access to a remote data object referenced by the remote data object stub; and marshaling the remote data object proxy into the processed inbound parcel as a replacement for the marshaled object.

* * * * *

UNITED STATES PATENT AND TRADEMARK OFFICE
CERTIFICATE OF CORRECTION

PATENT NO. : 12,373,267 B2
APPLICATION NO. : 17/806416
DATED : July 29, 2025
INVENTOR(S) : Guo et al.

Page 1 of 1

It is certified that error appears in the above-identified patent and that said Letters Patent is hereby corrected as shown below:

In the Claims

In Column 26, Line 4, in Claim 13, after "wherein the", delete "operation of"

Signed and Sealed this
Thirtieth Day of September, 2025

John A. Squires
*Director of the United States Patent and Trademark Office*